(12) United States Patent
Solomon et al.

(10) Patent No.: US 11,538,220 B2
(45) Date of Patent: *Dec. 27, 2022

(54) TANGIBLE OBJECT VIRTUALIZATION STATION

(71) Applicant: Tangible Play, Inc., Palo Alto, CA (US)

(72) Inventors: Mark Solomon, San Jose, CA (US); Ariel Zekelman, Palo Alto, CA (US); Jon Dukerschein, Pacifica, CA (US); Jerome Scholler, San Francisco, CA (US); Vivek Vidyasagaran, Palo Alto, CA (US)

(73) Assignee: Tangible Play, Inc., Palo Alto, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/085,753

(22) Filed: Oct. 30, 2020

(65) Prior Publication Data

US 2021/0049813 A1 Feb. 18, 2021

Related U.S. Application Data

(63) Continuation of application No. 16/232,313, filed on Dec. 26, 2018, now Pat. No. 10,854,001.

(Continued)

(51) Int. Cl.
*G06T 7/586* (2017.01)
*G06T 17/10* (2006.01)
(Continued)

(52) U.S. Cl.
CPC .............. *G06T 17/10* (2013.01); *G06T 7/521* (2017.01); *G06T 7/586* (2017.01); *G06V 20/64* (2022.01); *H04M 1/04* (2013.01); *H04N 5/2251* (2013.01); *G06V 2201/12* (2022.01); *H04M 1/0264* (2013.01); *H04M 1/72409* (2021.01); *H04M 2250/52* (2013.01)

(58) Field of Classification Search
CPC ......... G06T 17/10; G06T 7/521; G06T 7/586; G06K 9/00201; G06K 2209/40; H04M 1/04; H04M 1/0264; H04M 1/72409; H04M 2250/52; H04N 5/2251
See application file for complete search history.

(56) References Cited

U.S. PATENT DOCUMENTS 7,181,363 B2  2/2007 Ratti et al.
9,354,716 B1 * 5/2016 Sharma ................. G06F 3/0304
(Continued)

*Primary Examiner* — Christopher M Brandt
(74) *Attorney, Agent, or Firm* — VLP Law Group LLP; Michel Bohn

(57) ABSTRACT

A tangible object virtualization station including a base capable of stably resting on a surface and a head component unit connected to the base. The head component unit extends upwardly from the base. At an end of the head component opposite the base, the head component comprises a camera situated to capture a downward view of the surface proximate the base, a lighting array that directs light downward toward the surface proximate the base. The tangible object virtualization station further comprises a display interface included in the base. The display interface is configured to hold a display device in an upright position and connect the display device to the camera and the lighting array.

17 Claims, 13 Drawing Sheets

Related U.S. Application Data

(60) Provisional application No. 62/610,332, filed on Dec. 26, 2017.

(51) Int. Cl.
*G06T 7/521* (2017.01)
*H04N 5/225* (2006.01)
*H04M 1/04* (2006.01)
*G06V 20/64* (2022.01)
*H04M 1/02* (2006.01)
*H04M 1/72409* (2021.01)

(56) References Cited

U.S. PATENT DOCUMENTS

| | | | |
|---|---|---|---|
| 2010/0194863 A1* | 8/2010 | Lopes | G06T 7/12 |
| | | | 348/50 |
| 2011/0130159 A1* | 6/2011 | Chen | H04N 9/3173 |
| | | | 455/466 |
| 2013/0321447 A1 | 12/2013 | Horovitz et al. | |
| 2014/0125580 A1 | 5/2014 | Eun et al. | |
| 2015/0097947 A1* | 4/2015 | Hudman | G01S 17/89 |
| | | | 348/136 |
| 2015/0310728 A1* | 10/2015 | Calabrese | H04M 1/72409 |
| | | | 340/539.11 |
| 2015/0363003 A1 | 12/2015 | Henriz | |
| 2016/0105048 A1* | 4/2016 | Lee | F16M 3/00 |
| | | | 320/108 |
| 2017/0206693 A1 | 7/2017 | Sharma et al. | |
| 2019/0206126 A1 | 7/2019 | Solomon et al. | |

\* cited by examiner

TANGIBLE OBJECT VIRTUALIZATION STATION

CROSS-REFERENCE TO RELATED APPLICATIONS

The present application is a continuation of U.S. application Ser. No. 16/232,313, entitled "Tangible Object Virtualization Station," filed Dec. 26, 2018, which claims the benefit under 35 U.S.C. § 119(e) of U.S. Provisional Patent Application Ser. No. 62/610,332, entitled "Tangible Object Virtualization," filed on Dec. 26, 2017, the entire contents of which are incorporated herein by reference.

BACKGROUND

The present disclosure relates to tangible object virtualization.

A tangible object virtualization station is a physical environment that a user can physically interact with to manipulate digital information. While various tangible object virtualization stations have opened up a new range of possibilities for capturing physical information to manipulate digital information, current solutions present significant challenges when implemented.

For instance, existing tangible object virtualization stations generally require large, bulky stands to position a capture device (e.g., a camera) directly over a surface. These existing stations merely position a mobile device, such as a mobile phone over the surface and are dependent on the capture device such as a camera integrated into the phone to capture the physical information. The difficulty in positioning such large and awkward devices such that the capture device is directly overhead hinders the user experience and takes up unnecessary space. Furthermore, these large, bulky stands are not designed to be set up permanently, but rather are designed to be set up for an activity and taken down when the activity is completed. These existing tangible object virtualizations stations also have limited use in that they are designed for specific activities or games and outside of those activities or games, the existing tangible object virtualization stations have no other functional use.

SUMMARY

According to one innovative aspect of the subject matter in this disclosure, a tangible object virtualization station is described. In an example implementation, the tangible object virtualization station includes a base capable of stably resting on a surface; a head component unit connected to the base and extending upwardly from the base; at an end of the head component opposite the base, the head component including: a camera situated to capture a downward view of the surface proximate the base; and a lighting array that directs light downward toward the surface proximate the base; and a display interface included in the base, the display interface configured to hold a display device in an upright position and connect the display device to the camera and the lighting array.

Implementations may include one or more of the following features. The tangible object virtualization station where the lighting array further includes: a first light configured to direct light downward to a first portion of the surface; and a second light configured to direct light downward to a second portion of the surface. The tangible object virtualization station where the first portion of the surface includes a tangible object and the light is directed downward onto the tangible object. The tangible object virtualization station further including: a projector configured to project a point of light. The tangible object virtualization station where the projector is a laser projector. The tangible object virtualization station where the display interface is situated within a display device, the display device being separable from the base. The tangible object virtualization station where the display device includes the display interface and the display interface further includes a capture device configured to capture a view separate from the camera. The tangible object virtualization station where the display interface may be divided into a first display section and a second display section, the first display section presenting at least a portion of the view of the camera and the second display section presenting at least a portion of the view of the capture device. The tangible object virtualization station where the first display section and the second display section are displayed concurrently on the display interface. The tangible object virtualization station where the lighting array is configured to highlight a field of view of the camera to indicate the area of the surface within the field of view of the camera. The tangible object virtualization station further including: a first calibration sensor incorporated into the base, the first calibration sensor being detectable by a calibrator; a second calibration sensor incorporated into the head component unit, the second calibration sensor being detectable by the calibrator; and the calibrator coupled to the tangible object virtualization station configured to calibrate the physical information captured by the camera based on the first calibration sensor and the second calibration sensor. The tangible object virtualization station where the display interface is included within the base and where the base is further configured to receive an edge of the display device within a slot of the display interface and retain the display device. The tangible object virtualization station where the base further includes: a power connector situated within the slot, the power connector being configured to couple to the display device to provide power to the display device when the display device is positioned within the slot of the base. The tangible object virtualization station where the base further includes: a compressible component located beneath the power connector, the compressible component configured to be compressed when the display device is positioned within the slot of the base, the compressible component being configured to compress when the display device is positioned within the slot of the base. The tangible object virtualization station where the compressible component is configured to compress to different distances based on a configuration of the display device.

One general aspect includes A method including: capturing, using a first camera coupled to a tangible object virtualization station, a first video stream of a physical activity surface, the first camera being positioned above the physical activity surface and the first video stream depicting an overhead view of the physical activity surface, the first video stream including a tangible interface object; capturing using a second camera coupled to a display device positioned on a base of the tangible object virtualization station, a second video stream; detecting, using a processor of the display device, the tangible interface object in the first video stream; generating, using the processor of the display device, a virtualization based on the detected tangible interface object; and displaying on a display of the display device, a graphical user interface, the graphical user interface including a first display portion presenting the virtualization based on the tangible interface object and a second display portion presenting the second video stream.

Implementations may include one or more of the following features. The method where the second video stream includes a user and the second display portion displays the second video stream including the user.

One general aspect includes A method of providing an indication using a tangible object virtualization station, the method including: determining, using a camera of a tangible object virtualization station, a first portion of a surface proximate to a base of the tangible object virtualization station; projecting, using one or more lights of a lighting array of the tangible object virtualization station, a first indicator onto the first portion of the surface; determining, using the camera of the tangible object virtualization station, a second portion of the surface, the second portion of the surface being independent of the first portion of the surface; and projecting, using the one or more lights of the lighting array, a second indicator onto the second portion of the surface.

Implementations may include one or more of the following features. The method where the first portion of the surface includes a tangible object, the method further including: displaying on a display screen of a display device coupled to the tangible object virtualization station, a virtualization of the tangible object. The method where the first portion of the surface includes a tangible object, the method further including: displaying on a display screen of a display device coupled to the tangible object virtualization station, a virtualization of the tangible object.

Other implementations of one or more of these aspects and other aspects described in this document include corresponding methods, systems, apparatus, and computer programs, configured to perform actions, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The technology described herein provides a tangible object virtualization technology for capturing physical information (e.g., tangible object(s) 120) and using the captured physical information to manipulate digital information.

Figure 1A:
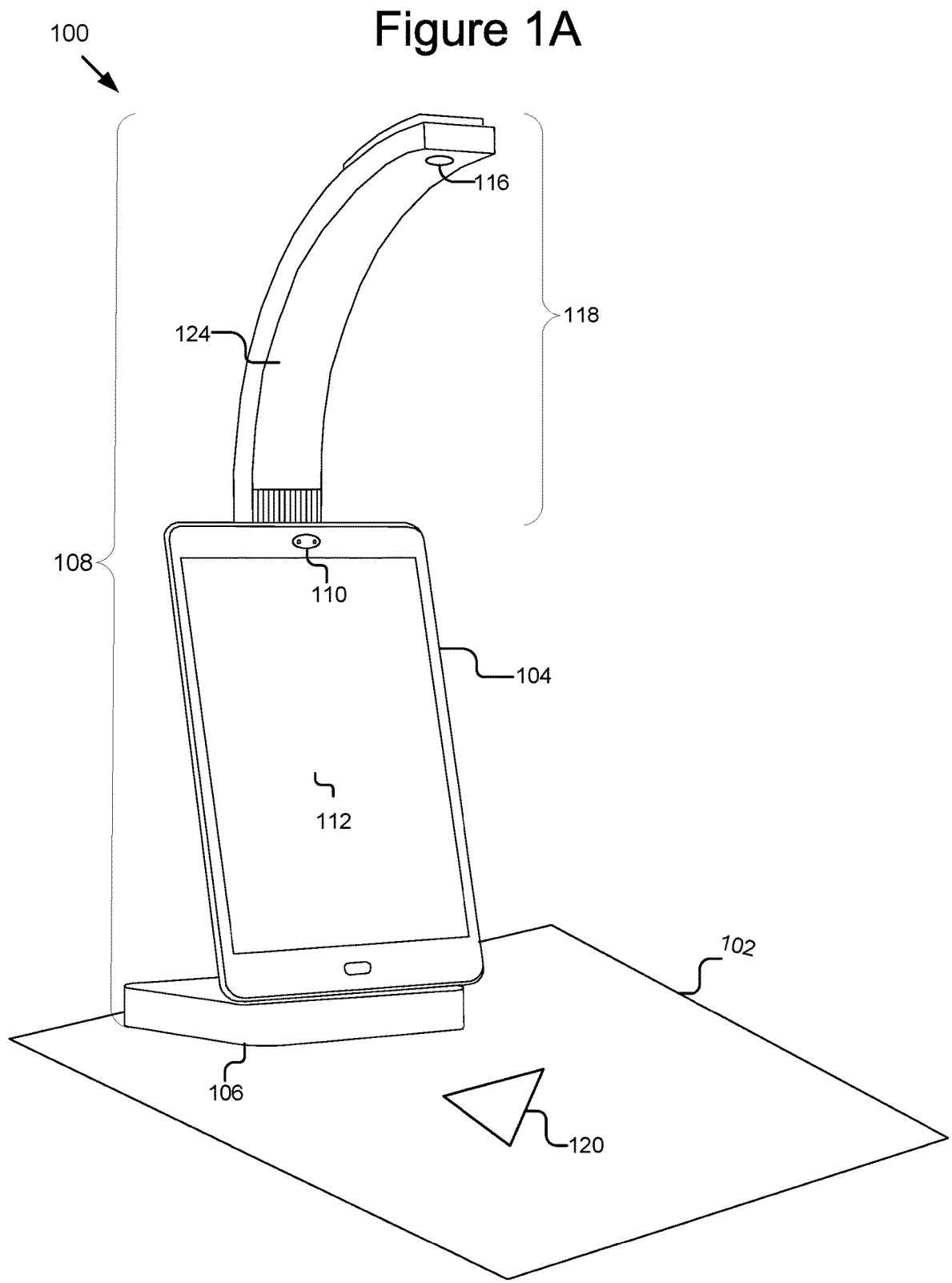
FIGS. 1A and 1B illustrate example configurations for a tangible object virtualization station.
Figure 1B:
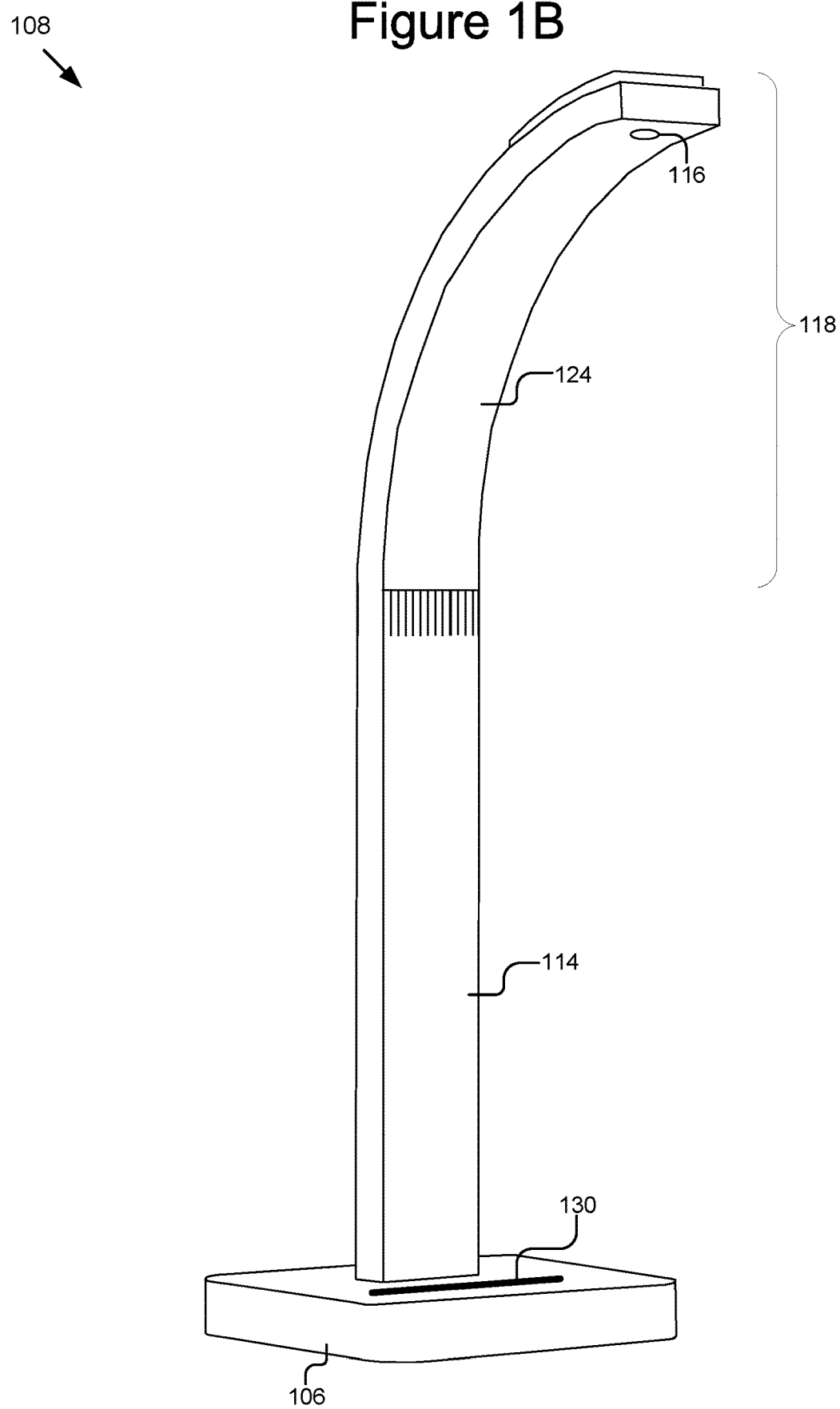

FIGS. 1A and 1B illustrate example configurations of a tangible object virtualization station 108. In FIG. 1A, the configuration 100 may be used for various activities in a surface 102. As depicted, the configuration 100 includes, the tangible object virtualization station 108, which may be positioned on a surface 102 on which tangible object(s) 120 may be placed (e.g., drawn, created, molded, built, projected, etc.). In some implementations (as depicted in FIG. 1A) the tangible object virtualization station 108 may be coupled to a display device 104 to process physical information captured via the station capture device 116 of the surface 102. The display device 104 includes novel software and/or hardware capable of displaying video streams and/or generating and/or displaying a virtualization 122 (not shown) of the tangible object(s) 120 on a display 112.

The tangible object virtualization station 108 may include a base 106 that supports the tangible object virtualization station 108. In some implementations (as depicted in FIG. 1), the base 106 may include a display interface for a display device 104. In some implementations, the display device 104 may be separable from the base 106 via the display interface, while in further implementations, the display device 104 may be incorporated into the base 106 via the display interface. In some cases, the display interface may comprise a holder 130 (e.g., slot) for receiving, holding, retaining, etc., a display device 104. The display device 104, such as but not limited to a tablet-type display device with an integrated display, may be positioned near vertically or another desired propped-up angle as described elsewhere herein. The display interface may embody a dock with connectors (such as connectors 904 and/or 906 as described with respect to FIGS. 9A and 9B) that are compatible with corresponding connectors of the display device 104. Non-limiting example connectors include USB (USBC, micro USB, reversible, etc.), Lightning, etc., which can be used to provide electrical current to charge the display device 104 and/or exchange data between the station 108 and the display device 104.

The tangible object virtualization station 108 may further include a support 114 for positioning the tangible object virtualization station 108. The support 114 may include a first end that may be connected to the base 106. The support 114 may further include a second end that may be connected to a head component unit 118. In further implementations, it should be understood that the support 114 could be any form of device configured to situate the head component unit 118 above the surface 102. For example, rather than a single support 114 as depicted in FIG. 1, the support 114 could include two or more separate sections that fold against themselves and may fold out to allow the head component unit 118 to be positioned and situated in desired locations.

In some implementations, the support 114 may be adjustable such that the length of the support 114 may be increased allowing the head component unit 118 to sit higher above the surface 102. The support 114 may include a mechanism for adjusting the length, such as but not limited to screws, clasps, rings, notches, etc., that may be tightened to exert pressure and keep stable the support 114 for adjusting the length. In some implementations, the support 114 may be connected to the base 106 and/or the head component unit 118 via one or more positionable connectors. The positionable connectors may allow the support 114 to adjust in degrees along the connection. For example, in one implementation, the positionable connectors may be a ball and socket joint and the support 114 may be positioned at any angle within the ball a socket joint. In further implementations, the positionable connectors may be hinges and the support 114 may be adjusted at any angle along the axis the hinge rotates. In further implementations, any suitable mechanism for positioning the support 114 may be used. Allowing the support 114 to be easily positioned and moved is advantageous for a user 222 (not shown) because it allows the tangible object virtualization station 108 to be used on a variety of surfaces 102 and/or in a variety of situations and the support 114 may be adjusted for maximum effect in each situation, such as to increase a field-of-view of a camera or to target a specific portion of the surface 102.

The head component unit 118 of the tangible object virtualization station 108 may include a station capture device 116 and/or a lighting array 124. In some implementations, the head component unit 118 may be fixed, while in further implementations, the head component unit 118 may be positionable using the support 114 and the positionable connector between the support 114 and the head component unit 118 to direct the head component unit 118 in a variety of environments. In some implementations, the station capture device 116 included in the head component unit 118 is incorporated into a bottom surface of the head component unit 118 and the station capture device 116 field of view is directed downward below the bottom surface of the head component unit 118. By adjusting the support length and/or the angle of the head component unit 118, the station capture device 116 may direct a field of view of the station capture device 116 towards the surface 102.

In some implementations, the head component unit 118 may be positioned such that the station capture device 116 captures substantially only a portion of the surface 102, while in further implementations, the head component unit 118 may be positioned such that the station capture device 116 includes a field of view of the entire and/or a significant portion of the surface 102, although numerous further implementations are also possible and contemplated. For instance, the station capture device 116 can split the field of view into two scenes that may be displayed in two portions of a display screen. In this example with two scenes, the station capture device 116 captures a first portion of the surface 102 that includes a first tangible object(s) 120 and further captures a second portion of the surface 102 that includes a second tangible object(s) 120.

In further implementations, the station capture device 116 may subdivide the viewing area. For example, the station capture device 116 may identify a first portion of the surface 102 as a primary focus area proximate to the base 106 and an extended vision area that includes the primary focus area and extends beyond the ends of the primary focus area on the surface 102. The station capture device 116 may be configured to capture physical information on the surface 102. The physical information may include a video stream that may be processed by a detector 304. Alternatively, the physical information may be images captured in sequence and processed by the detector 304.

In some implementations, the lighting array 124 includes an arrangement of lights that can be directed to create projections on different portions of the surface 102. In some implementations, the lighting array 124 can be made up of an array of addressable LED lights and the activity application(s) 214 can direct the lighting array 124 to turn on or off one or more of the individual LED lights in the lighting array 124 to create the projections. In some implementations, the LED lights may be white and/or colored such as RGB and the activity application(s) 214 may send signals to the lighting array 124 to change the colors. In some implementations, the light array 124 may be dimmable such as by turning on/and off individual LED lights in the lighting array 124 and/or adjusting an intensity of one or more individual lights in the lighting array 124. In some implementations, the activity application(s) 214 may cause the lighting array 124 to execute a variety of routines that include changing colors of one or more LED lights, turning individual LED lights on and/or off, and creating patterns and displays using the LED lights executing the routine. In some implementations, the light projections may be used to create indicators on the surface, such as to highlight a tangible object(s) 120 for interaction with a user, to indicate an error in a layout on the surface 102, to indicate a next step for a game, to indicate a new user to begin interacting, etc. In an example implementation, the lighting array 124 may include 97 individual LED lights and the lighting array 124 can output up to ~400 Lumens on the surface 102. In another example implementation, the lighting array 124 may include 44 individual LED lights. In some implementations, the tangible object virtualization station 108 may operate as a lamp using the lighting array 124. In some implementations, the lighting array 124 may be separately controlled by an on/off switch, while in further implementations, the lighting array 124 may be controlled using the display device 104, or a combination of the two. For example, the tangible object virtualization station 108 may have a standby mode when the display device 104 is not executing an application (or connected/coupled to the tangible object virtualization station 108) and when in standby mode, a button and/or switch on the tangible object virtualization station 108 may be pressed and/or interacted with to turn the lighting array 124 on and/or off similar to a lamp.

While the surface 102 is depicted as substantially horizontal in FIG. 1, it should be understood that the surface 102 can be vertical or positioned at any other angle suitable to the user for interaction. The surface 102 can have any color, pattern, texture, and topography. For instance, the surface 102 can be substantially flat or be disjointed/discontinuous in nature. Non-limiting examples of a surface 102 include a table, desk, counter, ground, a wall, a whiteboard, a chalkboard, a customized surface, etc.

The surface 102 may additionally or alternatively include a medium on which the user may render tangible object(s) 120, such as paper, canvas, fabric, clay, foam, or other suitable medium. In some implementations, the tangible object virtualization station 108 may be placed along an edge of the surface 102 rather than a middle of the surface 102 to preserve a greater area of the surface 102 for tangible object(s) 120 and interactions with a user. In some implementations, the surface 102 may be an average desk size (36×24×30 inches) and the station capture device 116 may be positioned to capture a field of view of the entire area of the surface 102. In further implementations, the surface 102 may be an average table size (60×30×30 inches) and the station capture device 116 may be positioned to capture a field of view of the entire area of the surface 102.

Figure 5A:
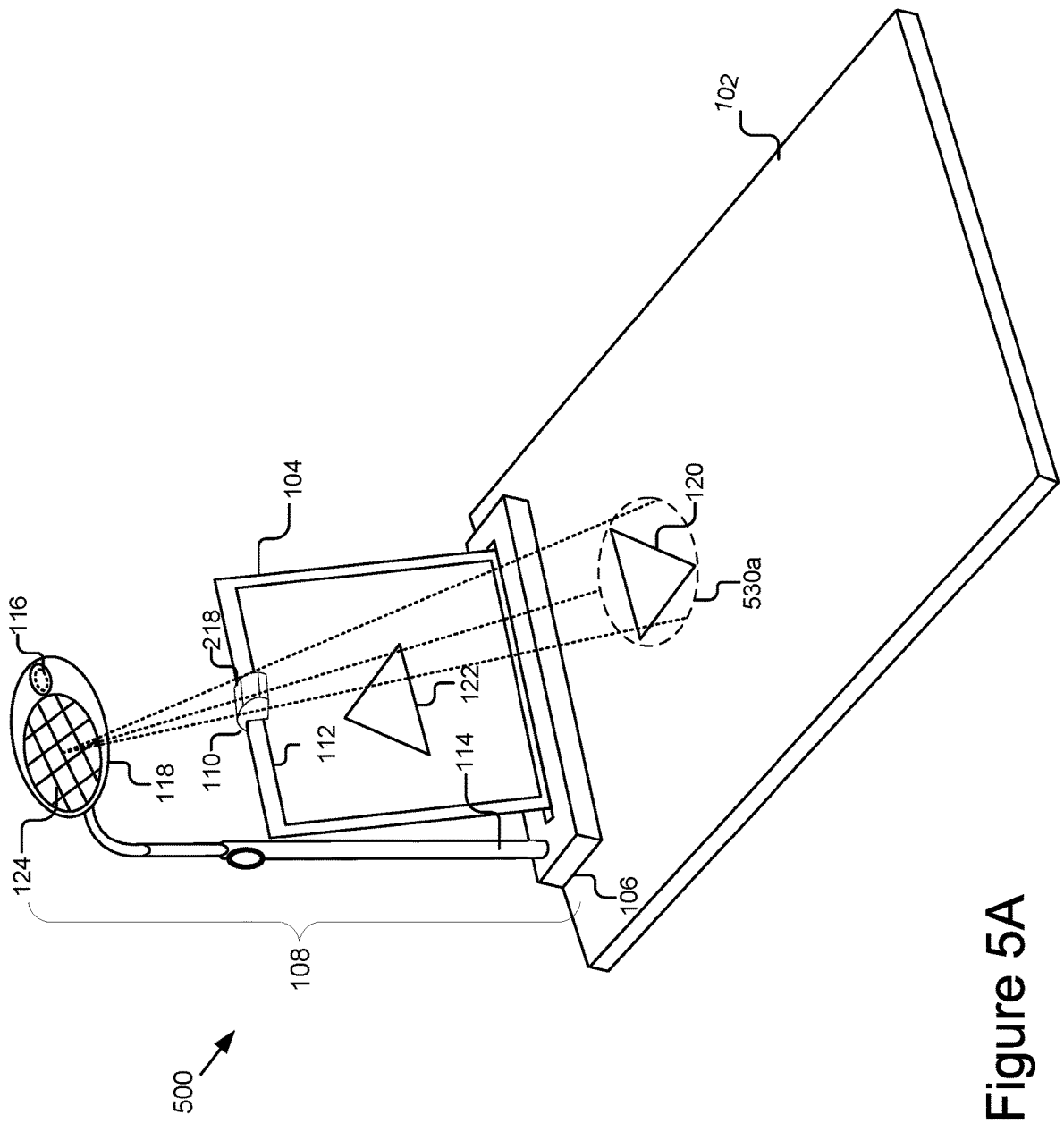
FIGS. 5A-5C illustrate another example configurations for a tangible object virtualization station.
Figure 5B:
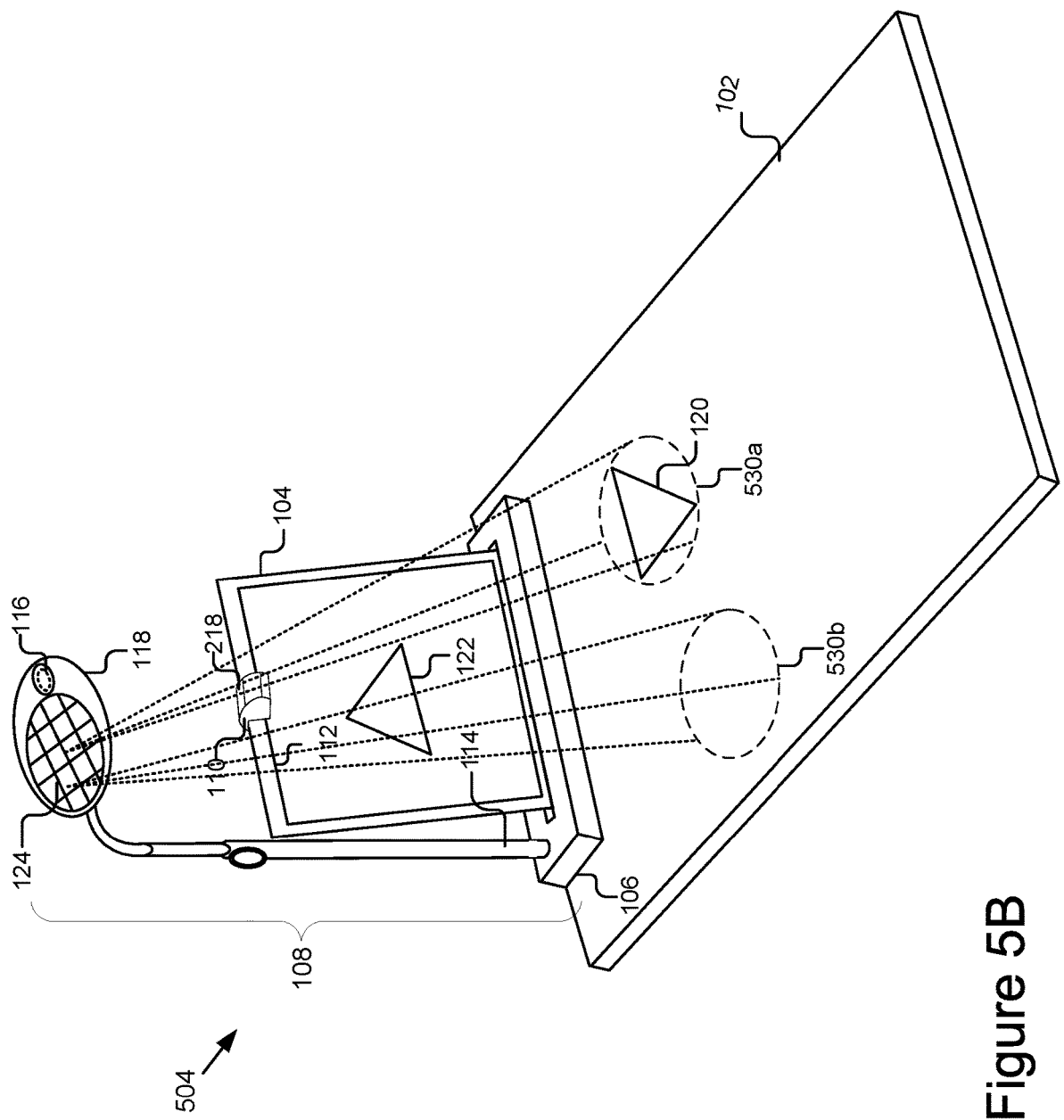
Figure 5C:
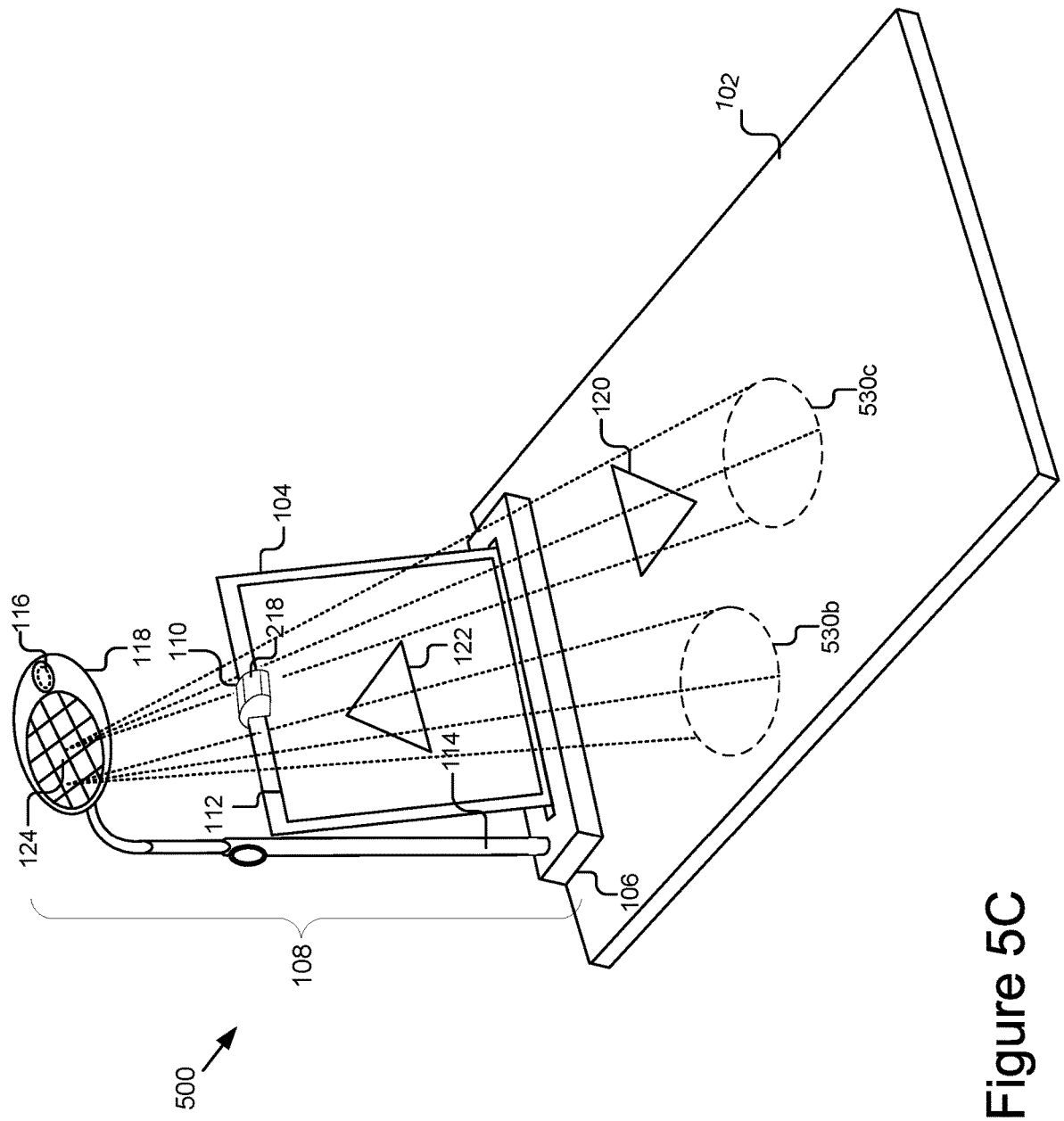

In some implementations, the tangible object virtualization station 108 may be coupled to a display device 104 as shown in the example configuration 100. The display device 104 may be situated within the holder 130 (such as a slot) in the base 106 as described elsewhere herein. In some implementations, the tangible object virtualization station 108 and the display device 104 may be situated with the display device 104 in front of the tangible object virtualization station 108 and the head component unit 118 may extend over the top of the display device 104. While in further implementations, the display device 104 may be positioned adjacent to the tangible object virtualization station 108 (as shown in FIGS. 5A-5C). Further implementations are possible and contemplated.

The display device 104 can provide the user(s) with a virtual portal for displaying virtualizations 122 (not shown). For example, the display device 104 may be placed on the surface 102 in front of a user so the user can easily see the display device 104 while interacting with tangible object(s) 120 on the surface 102. Example display devices 104 may include, but are not limited to, mobile phones (e.g., feature phones, smart phones, etc.), tablets, laptops, desktops, netbooks, TVs, set-top boxes, media streaming devices, portable media players, navigation devices, personal digital assistants, etc.

In some implementations, the display device 104 includes or is otherwise coupled (e.g., via a wireless or wired connection) to a separate video capture device 110 (also referred to herein as a camera) for capturing a separate video stream from the station capture device 116. As depicted in FIG. 1 the video capture device 110 may be a front-facing camera, or multiple front-facing cameras. Allowing for two separate streams of physical information to be captured. For example, the video capture device 110 may capture a video stream of a user in front of the display device 104 while the station capture device 116 may capture a video stream of the surface 102. In some implementations, the display device 104 may be further equipped with a camera adapter 218 (not shown) that adapts the field of view of the capture device 110 to include, at least in part, the surface 102. Allowing for two different views of the surface 102 to be captured simultaneously.

As depicted in FIG. 1A, the display device 104 may be positioned and/or supported by the base 106. For instance, the base 106 may position the display 112 in a position that is optimal for viewing and interaction by the user 222 who may be simultaneously interacting with the surface 102. The base 106 may be configured to rest on the surface 102 and receive and sturdily hold the display device 104 to the display device 104 remains still during use.

As shown in FIG. 1B, the tangible object virtualization station 108 may be used separately from the display device 104. In some implementations, the tangible object virtualization station 108 may be designed to appear aesthetically pleasing for decorating as a desk lamp and/or charging station. In some implementations, the design of the tangible object virtualization station 108 should be minimal so as not to appear bulky and cumbersome. In some implementations, the tangible object virtualization station 108 may include a physical switch, such as a capacitive touch switch that can be used to turn the light array 124 on or off and allow the tangible object virtualization station 108 to function as a lamp. In some implementations, the tangible object virtualization station 108 may include a microphone (not shown) and/or speaker (not shown) and the tangible object virtualization station 108 may be able to passively listen for voice commands and/or prompts, such as from a user 222 and/or a display device 104. The tangible object virtualization station 108 may be configured to perform voice recognition and actively respond to voice commands and/or prompts received either actively or passively. It should be understood that the tangible object virtualization station 108 should be configured with privacy features to preserve the user information received either actively and/or passively and allow a user 222 to perform privacy actions on the information gathered by the tangible object virtualization station 108. In some implementations, the speaker may be used to perform audible responses to the voice commands and/or prompts, play music, execute timers or alerts, etc. In some implementations, the tangible object virtualization station 108 may be configured to connect to a smart home device such as an Amazon Echo, Google Home, Apple Air Pod, etc. and use the smart home device functionality along with the tangible object virtualization station 108 to further adapt a user's 222 experience with a tangible interface object 120 and/or the virtual scene on the display device 104.

As shown in FIG. 1B, the base 106 may include a holder 130 (such as a slot) for retaining (e.g., receiving, securing, gripping, holding, etc.) a display of a display device 104, and in some cases, the display device 104 itself (e.g., such as with tablet-type display devices that include an integrated display).

In the depicted example, the display device 104 may be placed in and received by holder 130 when the holder 130 (also referred to as a slot 130) includes a compatibly sized slot formed in a top side of the base 106. The slot may extend at least partially downward into a main body of the base 106 at an angle so that when the display device 104 is secured in the slot, it is angled back for convenient viewing and utilization by a user 222 or users 222. The base 106 may be elongated along a horizontal axis to prevent the display device 104 from tipping over when resting on a substantially horizontal activity surface (e.g., a desk). The base 106 may include channeling for a cable that plugs into the display device 104. The cable may be configured to provide power to the tangible object virtualization station 108 and/or the display device 104 and/or may serve as a communication link to other display devices, such as a laptop or other personal computer.

Figure 2:
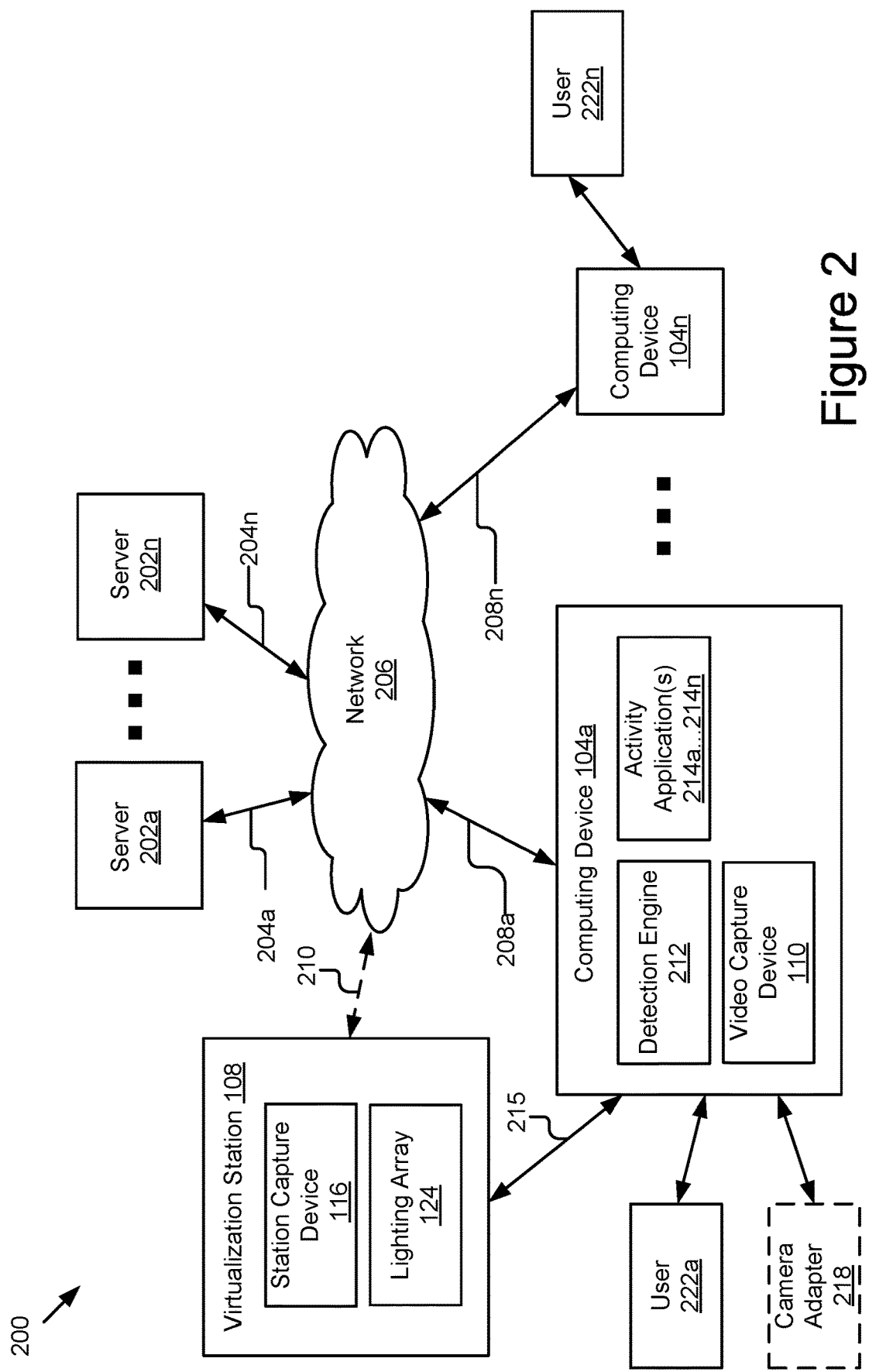
FIG. 2 is a block diagram illustrating an example computer system for a tangible object virtualization station.

FIG. 2 is a block diagram illustrating an example computer system 200 including a tangible object virtualization station 108. The illustrated system 200 includes the virtualization station 108, display devices 104a . . . 104n (also referred to individually and collectively as 104), and servers 202a . . . 202n (also referred to individually and collectively as 202), which are communicatively coupled via a network 206 for interaction with one another. For example, the display devices 104a . . . 104n may be respectively coupled to the network 206 via signal lines 208a . . . 208n and may be accessed by users 222a . . . 222n (also referred to individually and collectively as 222) and the virtualization station 108 may be coupled to the display device 104a via signal line 215. In some implementations, the virtualization station 108 may be configured to connect directly to the network 216 via signal line 210 rather than connecting to the network through the display device 104a. The servers 202a . . . 202n may be coupled to the network 206 via signal lines 204a . . . 204n, respectively. The use of the nomenclature "a" and "n" in the reference numbers indicates that any number of those elements having that nomenclature may be included in the system 200.

The network 206 may include any number of networks and/or network types. For example, the network 206 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The display devices 104a . . . 104n (also referred to individually and collectively as 104) are display devices having data processing and communication capabilities. For instance, a display device 104 may include a processor (e.g., virtual, physical, etc.), a memory, a power source, a network interface, and/or other software and/or hardware components, such as front and/or rear facing cameras, display, graphics processor, wireless transceivers, keyboard, camera, sensors, firmware, operating systems, drivers, various physical connection interfaces (e.g., USB, HDMI, etc.). The display devices 104a . . . 104n may couple to and communicate with one another and the other entities of the system 200 via the network 206 using a wireless and/or wired connection. While two or more display devices 104 are depicted in FIG. 2, the system 200 may include any number of display devices 104. In addition, the display devices 104a . . . 104n may be the same or different types of display devices.

As depicted in FIG. 2, one or more of the display devices 104a . . . 104n may include a video capture device 110, a detection engine 212, and activity application(s) 214. One or more of the display devices 104 and/or video capture device 110 may also be equipped with an adapter 218 as discussed elsewhere herein. The detection engine 212 is capable of detecting and/or recognizing tangible object(s) 120 and interactions within field of view of the video capture device 110. The detection engine 212 can detect the position and orientation of the tangible object(s) 120 in physical space, detect how the tangible object(s) 120 and/or interaction are being manipulated by the user 222, and cooperate with the activity application(s) 214 to provide users 222 with a rich virtual experience by presenting a virtualization 122 on the display 112.

In some implementations, the detection engine 212 processes video captured by the station capture device 116 and/or the video capture device 110 to detect physical information on the surface 102. The activity application(s) 214 are capable of determining virtual routines and/or responses based on the physical information and executing the routines and/or virtual responses, such as displaying a virtualization 122 on the display 112. Additional structure and functionality of the display devices 104 are described in further detail below with reference to at least FIG. 3.

Figure 4:
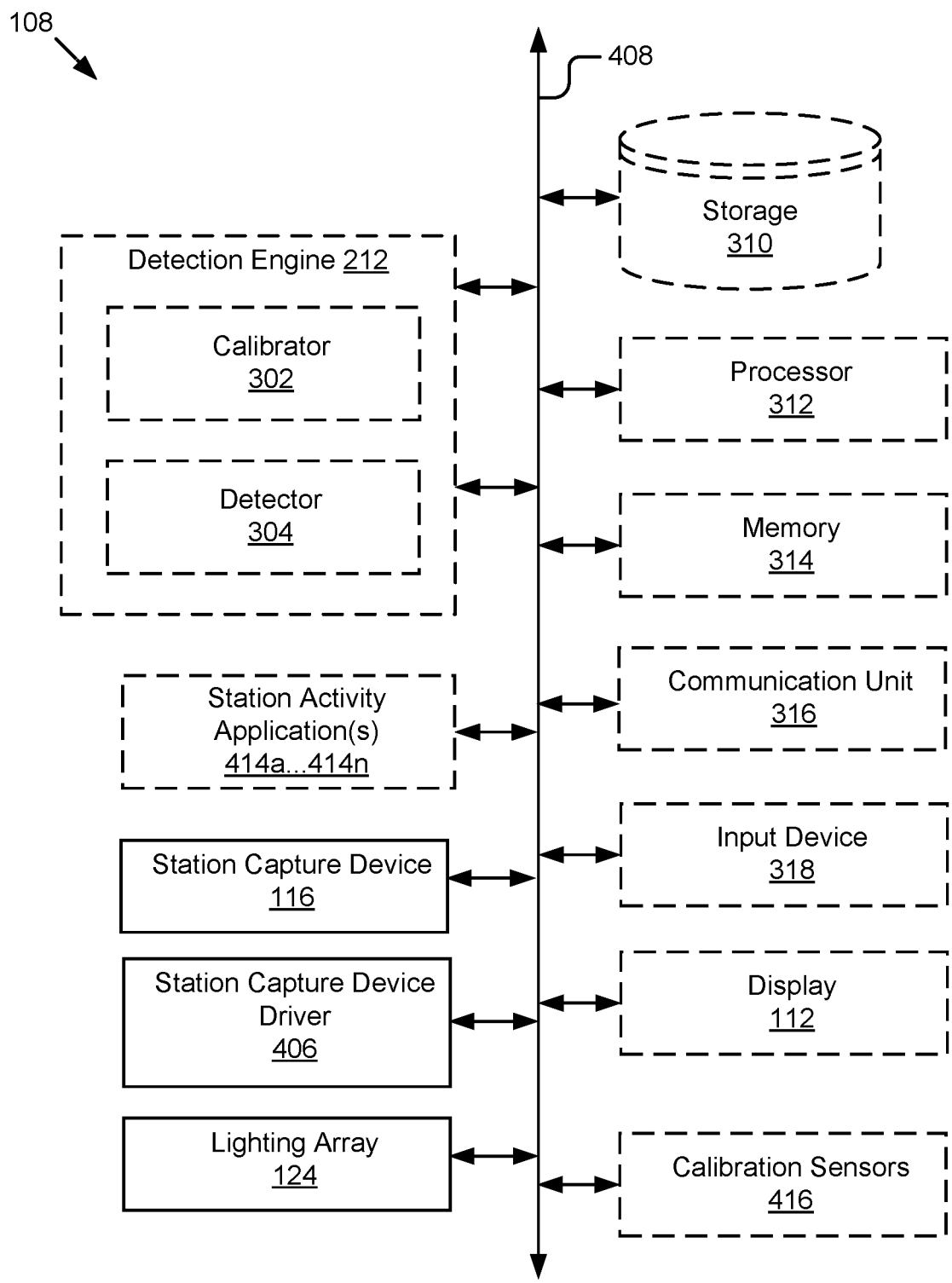
FIG. 4 is a block diagram illustrating an example tangible object virtualization station.

The virtualization station 108 may include the station capture device 116 and/or the lighting array 124 as described elsewhere herein. In some implementations, the virtualization station 108 may be coupled to the display device 104 to use the detection engine 212 and/or the activity applications(s) 214. While in further implementations, the virtualization station 108 may include separate components similar to those included in the display device 104, as shown in FIG. 4, allowing the virtualization station 108 to operate independent from the display device 104.

The servers 202 may each include one or more display devices having data processing, storing, and communication capabilities. For example, the servers 202 may include one or more hardware servers, server arrays, storage devices and/or systems, etc., and/or may be centralized or distributed/cloud-based. In some implementations, the servers 202 may include one or more virtual servers, which operate in a host server environment and access the physical hardware of the host server including, for example, a processor, memory, storage, network interfaces, etc., via an abstraction layer (e.g., a virtual machine manager).

The servers 202 may include software applications operable by one or more computer processors of the servers 202 to provide various computing functionalities, services, and/or resources, and to send data to and receive data from the display devices 104 and/or the virtualization station 108. For example, the software applications may provide functionality for internet searching; social networking; web-based email; blogging; micro-blogging; photo management; video, music and multimedia hosting, distribution, and sharing; business services; news and media distribution; user account management; or any combination of the foregoing services. It should be understood that the servers 202 are not limited to providing the above-noted services and may include other network-accessible services.

It should be understood that the system 200 illustrated in FIG. 2 is provided by way of example, and that a variety of different system environments and configurations are contemplated and are within the scope of the present disclosure. For instance, various functionality may be moved from a server to a client, or vice versa and some implementations may include additional or fewer display devices, services, and/or networks, and may implement various functionality client or server-side. Further, various entities of the system 200 may be integrated into a single display device or system or additional display devices or systems, etc.

In some implementations, the display device 104 may be further connected to a camera adapter 218. The camera adapter 218 may include one or more optical elements, such as mirrors and/or lenses, to adapt the standard field of view of the video capture device 110. For instance, the camera adapter 218 may include one or more mirrors and lenses to redirect and/or modify the light being reflected from surface 102 into the video capture device 110. As an example, the camera adapter 218 may include a mirror angled to redirect the light reflected from the surface 102 in front of the display device 104 into a front-facing camera of the display device 104. As a further example, many wireless handheld devices include a front-facing camera with a fixed line of sight with respect to the display 112. The camera adapter 218 can be detachably connected to the device over the video capture device 110 to augment the line of sight of the video capture device 110 so it can capture the surface 102 (e.g., surface of a table). The mirrors and/or lenses in some implementations can be polished or laser quality glass. In other examples, the mirrors and/or lenses may include a first surface that is a reflective element. The first surface can be a coating/thin film capable of redirecting light without having to pass through the glass of a mirror and/or lens. In an alternative example, a first surface of the mirrors and/or lenses may be a coating/thin film and a second surface may be a reflective element. In this example, the lights passes through the coating twice, however since the coating is extremely thin relative to the glass, the distortive effect is reduced in comparison to a conventional mirror. This reduces the distortive effect of a conventional mirror in a cost effective way.

In another example, the camera adapter 218 may include a series of optical elements (e.g., mirrors) that wrap light reflected off the surface 102 located in front of the display device 104 into a rear-facing camera of the display device 104 so it can be captured. The camera adapter 218 could also adapt a portion of the field of view of the video capture device 110 (e.g., the front-facing camera) and leave a remaining portion of the field of view unaltered so that multiple scenes may be captured by the video capture device 110. The camera adapter 218 could also include optical element(s) that are configured to provide different effects, such as enabling the video capture device 110 to capture a greater portion of the surface 102. For example, the camera adapter 218 may include a convex mirror that provides a fisheye effect to capture a larger portion of the surface 102 than would otherwise be capturable by a standard configuration of the video capture device 110. In further implementations, the camera adapter 218 is not used and the video capture device 110 captures a field of view that is not reflected by the camera adapter 218.

Figure 3:
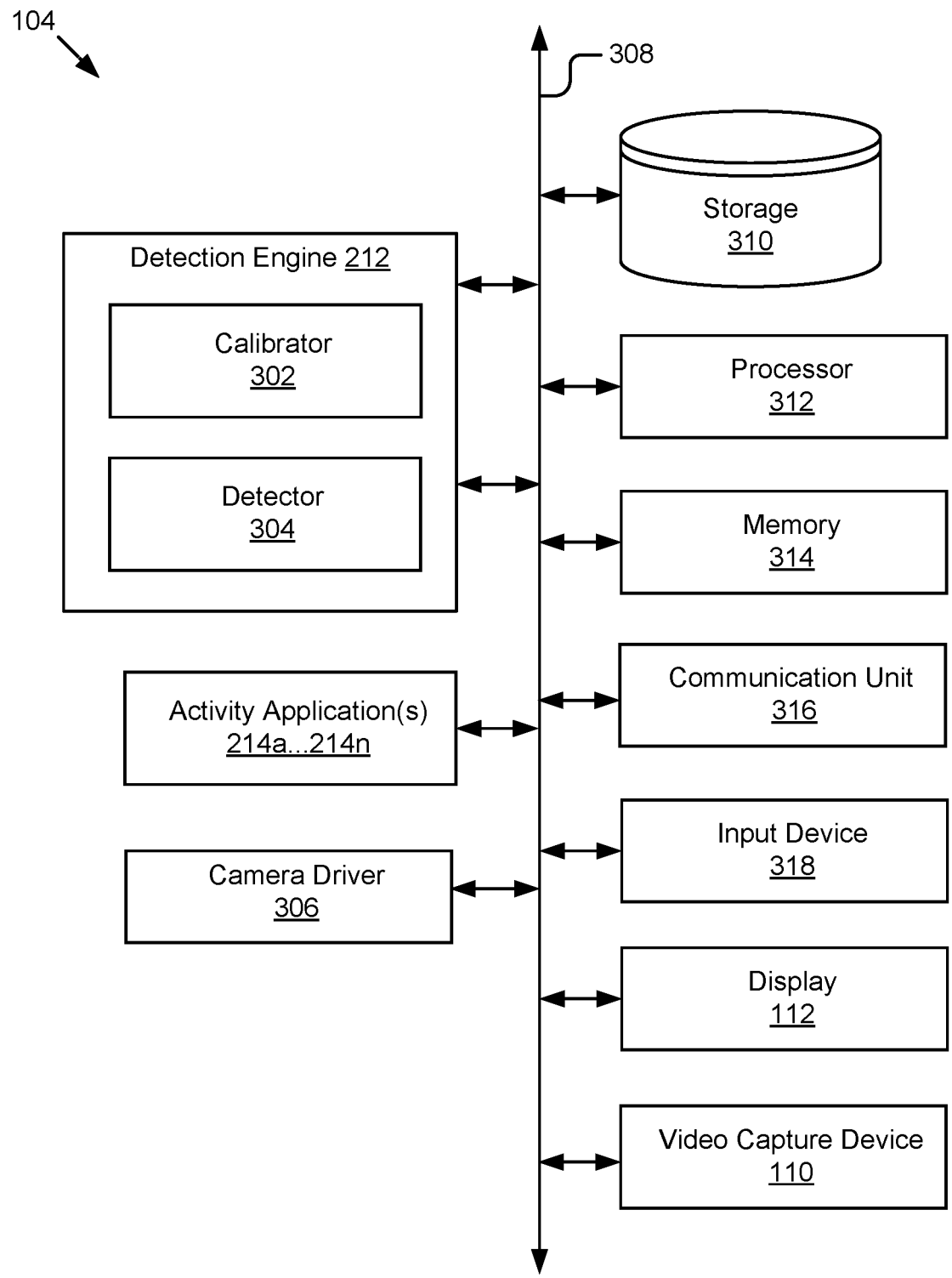
FIG. 3 is a block diagram illustrating an example display device.

FIG. 3 is a block diagram of an example display device 104. As depicted, the display device 104 may include a processor 312, memory 314, communication unit 316, display 112, video capture device 110, detection engine 212, activity application(s) 214, camera driver 306, and an input device 318, which are communicatively coupled by a communications bus 308. However, it should be understood that the display device 104 is not limited to such and may include other elements, including, for example, those discussed with reference to the display devices 104 in FIGS. 1A-1B and 2.

The processor 312 may execute software instructions by performing various input/output, logical, and/or mathematical operations. The processor 312 has various computing architectures to process data signals including, for example, a complex instruction set computer (CISC) architecture, a reduced instruction set computer (RISC) architecture, and/or an architecture implementing a combination of instruction sets. The processor 312 may be physical and/or virtual, and may include a single core or plurality of processing units and/or cores.

The memory 314 is a non-transitory computer-readable medium that is configured to store and provide access to data to the other elements of the display device 104. In some implementations, the memory 314 may store instructions and/or data that may be executed by the processor 312. For example, the memory 314 may store the detection engine 212, the activity application(s) 214, and the camera driver 306. The memory 314 is also capable of storing other instructions and data, including, for example, an operating system, hardware drivers, other software applications, data, etc. The memory 314 may be coupled to the bus 308 for communication with the processor 312 and the other elements of the display device 104.

The communication unit 316 may include one or more interface devices (I/F) for wired and/or wireless connectivity with the network 206 and/or other devices. In some implementations, the communication unit 316 may include transceivers for sending and receiving wireless signals. For instance, the communication unit 316 may include radio transceivers for communication with the network 206 and for communication with nearby devices using close-proximity (e.g., Bluetooth®, NFC, etc.) connectivity. In some implementations, the communication unit 316 may include ports for wired connectivity with other devices. For example, the communication unit 316 may include a CAT-5 interface, Thunderbolt™ interface, FireWire™ interface, USB interface, etc.

The display 112 may display electronic images and data output by the display device 104 for presentation to a user 222. The display 112 may include any conventional display device, monitor or screen, including, for example, an organic light-emitting diode (OLED) display, a liquid crystal display (LCD), etc. In some implementations, the display 112 may be a touch-screen display capable of receiving input from one or more fingers of a user 222. For example, the display 112 may be a capacitive touch-screen display capable of detecting and interpreting multiple points of contact with the display surface. In some implementations, the display device 104 may include a graphics adapter (not shown) for rendering and outputting the images and data for presentation on display 112. The graphics adapter (not shown) may be a separate processing device including a separate processor and memory (not shown) or may be integrated with the processor 312 and memory 314.

The input device 318 may include any device for inputting information into the display device 104. In some implementations, the input device 318 may include one or more peripheral devices. For example, the input device 318 may include a keyboard (e.g., a QWERTY keyboard), a pointing device (e.g., a mouse or touchpad), microphone, a camera, etc. In some implementations, the input device 318 may include a touch-screen display capable of receiving input from the one or more fingers of the user 222. For instance, the functionality of the input device 318 and the display 112 may be integrated, and a user 222 of the display device 104 may interact with the display device 104 by contacting a surface of the display 112 using one or more fingers. In this example, the user 222 could interact with an emulated (i.e., virtual or soft) keyboard displayed on the touch-screen display 112 by using fingers to contact the display 112 in the keyboard regions.

The detection engine 212 may include a detector 304. The elements 212 and 304 may be communicatively coupled by the bus 308 and/or the processor 312 to one another and/or the other elements 214, 306, 310, 314, 316, 318, 112, and/or 110 of the display device 104. In some implementations, one or more of the elements 212 and 304 are sets of instructions executable by the processor 312 to provide their functionality. In some implementations, one or more of the elements 212 and 304 are stored in the memory 314 of the display device 104 and are accessible and executable by the processor 312 to provide their functionality. In any of the foregoing implementations, these components 212, and 304 may be adapted for cooperation and communication with the processor 312 and other elements of the display device 104.

The detector 304 includes software and/or logic for processing physical information captured by the station capture device 116 and/or the video stream captured by the video capture device 110 to detect tangible object(s) 120 and/or an interaction included in the video stream and/or physical information. In some implementations, the detector 304 may identify line segments related to tangible object(s) 120 and/or an interaction on the surface 102. In some implementations, the detector 304 may be coupled to and receive the video stream from the station capture device 116, the video stream from the video capture device 110, the camera driver 306, and/or the memory 314 or alternatively the station capture device 116 and/or the station capture device driver 406. In some implementations, the detector 304 may process the images of the video stream and/or physical information to determine positional information for the line segments related to the tangible object(s) 120 and/or an interaction on the surface 102 (e.g., location and/or orientation of the line segments in 2D or 3D space) and then analyze characteristics of the line segments included in the video stream and/or physical information to determine the identities and/or additional attributes of the line segments.

The detector 304 may recognize the line by identifying its contours. The detector 304 may also identify various attributes of the line, such as colors, contrasting colors, depth, texture, etc. In some implementations, the detector 304 may use the description of the line and the line attributes to identify the tangible object(s) 120 by comparing the description and attributes to a database of objects and identifying the closest matches.

The detector 304 may be coupled to the storage 310 via the bus 308 to store, retrieve, and otherwise manipulate data stored therein. For example, the detector 304 may query the storage 310 for data matching any line segments that it has determined are present on the surface 102. In all of the above descriptions, the detector 304 may send the detected images to the detection engine 212 and the detection engine 212 may perform the above-described features.

The detector 304 may be able to process the physical information and/or the video stream to detect an interaction on the surface 102. In some implementations, the detector 304 may be configured to understand relational aspects between the tangible object(s) 120 and determine an interaction based on the relational aspects. For example, the detector 304 may be configured to identify an interaction related to one or more tangible object(s) 120 present on the surface 102 and the activity application(s) 214 may determine a virtualization 122 and/or response based on the relational aspects between the one or more tangible object(s) 120 and the interaction.

The calibrator 302 may include software and/or logic for calibrating the physical information and/or video stream to correct errors before sending the physical information to the detector 304. The calibrator 302 may be able to determine an angle of the station capture device 116 and/or the video capture device 110 and correct for image processing errors such as skewing and/or keystoning based on the angle. The calibrator 302 may further be configured to identify a portion of the base 106 and include the portion of the base 106 in the physical information and/or video stream information to use as a calibration reference point. In further implementations, the calibrator 302 may receive calibration data from calibration sensors 416 to improve calibration. The calibration sensors can include accelerometers in the tangible object virtualization station 108, laser and/or infrared beams that are directed and captured on the surface 102, etc. These calibration sensors allow the calibrator 302 to determine the location and angles of the station capture device 116 and/or video capture device 110 and provide information such as focusing of the lenses, zooming of the field of view, angle correction in post processing, etc. The calibrator 302 may be connected to the detector 304 and provide information to the detector 304 to improve recognition of tangible object(s) 120 and/or interactions on the surface 102.

The activity application(s) 214 include software and/or logic for executing virtual responses such as virtualization 122. The activity application(s) 214 may be coupled to the detector 304 via the processor 312 and/or the bus 308 to receive information related to the detected tangible object(s) 120 and/or the interaction. For example, a user 222 may perform an interaction such as moving tangible object(s) 120 and the activity application(s) 214 may determine an appropriate virtual response based on the physical movement of the tangible object(s) 120, such as moving a virtualization 122 of the tangible object(s) 120 on the display screen 112.

In some implementations, the activity application(s) 214 may determine the virtual responses by searching through a database of virtual responses that are compatible with the detected interaction. In some implementations, the activity application(s) 214 may access a database of virtual responses stored in the storage 310 of the display device 104. In further implementations, the activity application(s) 214 may access a server 202 to search for virtual responses. In some implementations, a user 222 may predefine a virtual response to include in the database of virtual responses.

In some implementations, the activity application(s) 214 may enhance the virtual scene and/or the virtualization 122 as part of the virtual response. For example, the activity application(s) 214 may display visual enhancements as part of executing the virtual response. The visual enhancements may include adding color, extra virtualizations, background scenery, etc. In further implementations, the visual enhancements may include having the virtualization 122 move or interact with another virtualization (not shown) in the virtual scene.

In some instances, the manipulation of the tangible object(s) 120 by the user 222 on the surface 102 may be incrementally presented on the display 112 as the user 222 manipulates the tangible object(s) 120. Non-limiting examples of the activity applications 214 may include video games, learning applications, assistive applications, storyboard applications, collaborative applications, productivity applications, homework assistance, content creation, cooking tutorials, makeup tutorials, painting tutorials, etc.

In some implementations, the activity application(s) 214 may include software and/or logic for controlling the lighting array 124. The activity application(s) 214 may include the necessary drivers to select and power one or more of the lights within the lighting array 124. The activity application(s) 214 may further be able to determine which lights within the lighting array 124 should be turned on at a given time based on the addressable nature of the LED lights in order to create projections on portions of the surface 102. For example, the activity application(s) 214 may be configured to turn all (or a significant portion) of the lights of the lighting array 124 on at a given time to highlight the area of the surface 102 that is included in field of view of the station capture device 116. In further implementations, the activity application(s) 214 may be configured to determine one or more specific portions of the surface 102 and provide commands to the lighting array 124 to create light projections on the surface at the one or more specific portions of the surface 102.

The camera driver 306 includes software storable in the memory 314 and operable by the processor 312 to control/operate the video capture device 110. For example, the camera driver 306 is a software driver executable by the processor 312 for signaling the video capture device 110 to capture and provide a video stream and/or still image, etc. The camera driver 306 is capable of controlling various features of the video capture device 110 (e.g., flash, aperture, exposure, focal length, etc.). The camera driver 306 may be communicatively coupled to the video capture device 110 and the other components of the display device 104 via the bus 308, and these components may interface with the camera driver 306 via the bus 308 to capture video and/or still images using the video capture device 110.

As discussed elsewhere herein, the video capture device 110 is a video capture device configured to capture video of at the surface 102. The video capture device 110 may be coupled to the bus 308 for communication and interaction with the other elements of the display device 104. The video capture device 110 may include one or more lenses (e.g., from one or more cameras) for gathering and focusing light, a photo sensor including pixel regions for capturing the focused light and a processor for generating image data based on signals provided by the pixel regions. The photo sensor may be any type of photo sensor including a charge-coupled device (CCD), a complementary metal-oxide-semiconductor (CMOS) sensor, a hybrid CCD/CMOS device, etc. The video capture device 110 may also include any conventional features such as a flash, a zoom lens, etc. The video capture device 110 may include a microphone (not shown) for capturing sound or may be coupled to a microphone included in another component of the display device 104 and/or coupled directly to the bus 308. In some implementations, the processor of the video capture device 110 may be coupled via the bus 308 to store video and/or still image data in the memory 314 and/or provide the video and/or still image data to other elements of the display device 104, such as the detection engine 212 and/or activity application(s) 214.

The storage 310 is an information source for storing and providing access to stored data, such as a database of virtual responses, gallery(ies) of virtual responses that may be displayed on the display 112, user profile information, community developed virtual responses, virtual enhancements, etc., object data, calibration data, and/or any other information generated, stored, and/or retrieved by the activity application(s) 214.

In some implementations, the storage 310 may be included in the memory 314 or another storage device coupled to the bus 308. In some implementations, the storage 310 may be or included in a distributed data store, such as a cloud-based computing and/or data storage system. In some implementations, the storage 310 may include a database management system (DBMS). For example, the DBMS could be a structured query language (SQL) DBMS. For instance, storage 310 may store data in an object-based data store or multi-dimensional tables comprised of rows and columns, and may manipulate, i.e., insert, query, update, and/or delete, data entries stored in the verification data store using programmatic operations (e.g., SQL queries and statements or a similar database manipulation library). Additional characteristics, structure, acts, and functionality of the storage 310 is discussed elsewhere herein.

FIG. 4 is a block diagram of an example tangible object virtualization station 108. As depicted, the tangible object virtualization station 108 may include a station capture device 116, a station capture device driver 406, a lighting array 124, and calibration sensors 416. In further implementations, the tangible object virtualization station 108 may operate independent of the display device 104 and may be directly coupled to components described above with respect to the display device 104 including one or more of the processor 312, the memory 314, the communication unit 316, the display 112, the detection engine 212, the activity application(s) 214, and an input device 318, which may be communicatively coupled by a communications bus 408 in such instances. In further instances, it should be understood that the tangible object virtualization station 108 may be configured to include components similar to those described above while still being coupled to the display device 104 to allow for greater processing power and independent functionality of the tangible object virtualization station 108 and the display device 104. It should further be understood that the tangible object virtualization device 108 is not limited to such and may include other elements, including, for example, those discussed with reference to FIGS. 1, 2, and 3.

The station capture device driver 406 includes software storable in the memory 314 and operable by the processor 312 to control/operate the station capture device 116. For example, the station capture device driver 406 is a software driver executable by the processor 312 for signaling the station capture device 406 to capture and provide physical information such as a video stream and/or still image, etc. The station capture device driver 406 is capable of controlling various features of the station capture device 116 (e.g., flash, aperture, exposure, focal length, etc.). The station capture device driver 406 may be communicatively coupled to the station capture device 116 and the other components of the tangible object virtualization station 108 via the bus 408, and these components may interface with the station capture device driver 406 via the bus 408 to capture video and/or still images using the station capture device 116.

As discussed elsewhere herein, the station capture device 116 is a video capture device configured to capture video of at least the surface 102. The station capture device 116 may be coupled to the bus 408 for communication and interaction with the other elements of the tangible object virtualization station 108. The station capture device 116 may include one or more lenses (e.g., multiple cameras) for gathering and focusing light, a photo sensor including pixel regions for capturing the focused light and a processor for generating image data based on signals provided by the pixel regions. The photo sensor may be any type of photo sensor including a charge-coupled device (CCD), a complementary metal-oxide-semiconductor (CMOS) sensor, a hybrid CCD/CMOS device, etc. The station capture device 116 may also include any conventional features such as a flash, a zoom lens, etc. The station capture device 116 may include a microphone (not shown) for capturing sound or may be coupled to a microphone included in another component of the tangible object virtualization station 108 and/or the display device 104 and/or coupled directly to the bus 408. In some implementations, the processor of the station capture device 116 may be coupled via the bus 408 to store video and/or still image data in the memory 314 and/or provide the video and/or still image data to other elements of the tangible object virtualization station 108 and/or the display device 104, such as the detection engine 212 and/or activity application(s) 214. In some example implementations, the station capture device 116 may include a camera capable of capture 8 mega-pixel images and may be capable of streaming video at 1600×1200@30 fps, 1024×768@60 fps, or 640×480@120 fps, although other specifications of cameras are known and contemplated. In some implementations, the station capture device 116 may be able to connect to other devices using USB-UVC standards and in further implementations, the data captured by the station capture device 116 may be sent using H264 compression or other known compression methods. In some implementations, the station capture device 116 may including the following features: windowing (such as to be able to stream any portion of an image to a target dimension), exposure, contrast, focus, auto-focus using software algorithms, arbitrary 90-degree rotation of the video capture device 116, arbitrary mirroring of the video stream captured by the video capture device 116. In some implementations, the video capture device 116 may include software or logic to perform optical character recognition ("OCR") of the video stream and the display device 104 may present the OCR version of the video stream. For example, a user may be performing some math homework on the surface and the station capture device 116 may OCR the image from the video stream of the math homework. The display device 104 may then display the OCR version of the math homework on the display 112 and perform additional functions based on the recognized objects in the math homework, such as calculating answers, searching online using recognized text, etc. In some implementations, the field of view of the station capture device 116 may be dictated by a shape of the lens. In one specific example implementation, the lens may provide a viewing angle of 50 degrees in one direction and 64 degrees in a perpendicular direction, although it should be understood that this is merely one example of viewing angles and other viewing angles are also contemplated.

The lighting array 124 includes software and/or logic to control an array of one or more light sources integrated into the head component unit 118. The light sources may be arranged in any fashion to create an array that can direct light to different portions of the surface 102. In some implementations, the light sources may be directed to different portions such that when all of the light sources are emitting light, the entire surface 102 will be illuminated. The lighting array 124 may be coupled to the activity application(s) 214 to receive commands related to which light sources to turn on and create projections of light on the surface 102. The light sources may be any source of light that can be arranged in an array, such as light emitting diodes (LEDs), fluorescent lights, incandescent bulbs, infrared light projectors, laser projectors, or other common electronic light sources. In a further example, the projector may comprise a high-definition projector capable of casting an image having a desired resolution (e.g., 720p, 1080p, 2K, 4K, 5K, or any other suitable resolution) onto the surface 102 and/or items situated on the surface 102. Non-limiting examples projectors include (digital light processing) DLP, (liquid crystal display) LCD, (liquid crystal on silicon) LCoS, and/or other types of projectors. Such projectors can project color or black/white still and/or moving (e.g., animated, video, etc.) images to enhance and/or animate the surface 102 and/or item. For instance, the projector could project one or more targets (e.g., cross hair, etc.), graphics, navigation paths, animations, etc., on the surface 102 and/or items on the surface 102. In another example, the projector can display an animated face on a creature item placed on the surface.

The calibration sensors 416 include hardware sensors for detecting various calibration data, including accelerometers, infrared light projectors, laser pointers, etc. In some implementations, one or more accelerometers may be incorporated into various portions of the tangible object virtualization station 108 and provide information of the angle and direction of that portion of the tangible object virtualization station 108 to the calibrator 302. In further implementations, an infrared light projector or laser may emit light onto the surface 102 and the light may be captured using a detector in order to determine angle, direction, field of view, skewing, etc. that can be passed on to the calibrator 302 in the form of calibration data.

FIG. 5A is a graphical representation 500 illustrating an example configuration for the tangible object virtualization station 108. In the example configuration, a tangible object 120 is present on the surface 102. The station capture device 116 is configured to capture a video stream of the surface 102 and the detector 304 processes the video stream to detect the tangible object 120 and identify the tangible object 120. The activity application(s) 214 receives the information from the detector 304 including the identified tangible object 120 and presents on the display 112 a virtualization 122 based on the identified tangible object 120. In this example implementation, the activity application(s) 214 is configured to execute a program that causes the lighting array 124 to project a light projection 530a onto the surface 102 in a specific location that the tangible object 120 was detected on the surface 102. The light projection 530a may include one or more lights from the lighting array directed to the specific location. In some implementations, the light projections 530a may be about six inches in diameter while other sizes and diameters are also possible. In some implementations, the lighting array may be able to direct and focus individual lights in the array to create brighter and narrower beams of light that can be projected while other lights in the array are also projecting light onto the surface 102.

FIG. 5B is a graphical representation 502 illustrating an example configuration for the tangible object virtualization station 108. In the example configuration, the activity application(s) 214 causes the lighting array 124 to project a second light projection 530b onto the surface 102. The activity application(s) 214 may cause the second light projection 530b to highlight the portion of the surface 102 for a variety of reasons. For example, in some implementations, the second light projection 530b may indicate an area that a user 222 may move a tangible object 120 to or an area where additional tangible object(s) 120 may be positioned for later use. In further implementations, two users 222 may be interacting with the tangible object(s) 120 on opposite sides of the surface 102 (e.g., a desk or table) and the second light projection 530b may be directed to the side of the surface 102 that the second user 222 is positioned indicating that the second user 222 should perform an interaction on the surface 102.

FIG. 5C is a graphical representation 504 illustrating an example configuration for the tangible object virtualization station 108. In the example configuration, the activity application(s) 214 causes the lighting array 124 to project a third light projection 530c onto the surface 102. The activity application(s) 214 further causes the lighting array to stop projecting the first light projection (not shown) onto the surface 102. It should be understood that any number of light projections 530 can be projected onto the surface 102 by the lighting array and only having two light projections 530 in this example is not a limiting factor. The third light projection 530c projects light onto a third portion of the surface 102. The activity application(s) 214 causes the third light projection 530c to be projected for any number of reason including, indicating a portion of the surface 102 that a user should interact with such as by placing a tangible object(s) 120 or where the activity application(s) 214 expects a tangible object(s) 120 to be detected but a tangible object(s) 120 was not detected.

In some implementations, the activity application(s) 214 may cause the lighting array 124 to project light projections 530 in a grid alignment (such as a 1:1 grid alignment in some implementations). For example, the light projections 530 may highlight a first portion of the surface 102 to indicate prompt an action or signal change in state. For instance, the highlighting may indicate to a first user that it is their turn to make a move in a game being played. In response to the highlighting, the first user's interaction with tangible object(s) 120 may be detected and the activity application(s) 214 may cause the lighting array 124 to project a light projection 530 to highlight a second portion of the surface 102 (e.g., to indicate to a second user that it is their turn), and so on and so forth. In this example, the first portion of the surface can be adjacent to where a first user is located and the second portion of the surface can be adjacent to where a second user is located, although other variations are also possible and contemplated.

In some implementations, the activity application(s) 214 may identify any portion of the surface 102 based on a grid and may cause the light array 124 to direct a light projection 530 to any of the grid sections to highlight various actions. By way of example and not limitation, the activity application(s) 214 may cause the light array 124 to create light projections 530 in an alternating manner to create a checkerboard (or a path, goal, target area, etc.) of light and dark areas for game play. Users may be able to use the projected checker-board projection to move tangible object(s) 120 into various portions of the surface 102 denoted by the light and dark areas of the checker-board projections. These examples of projections 530 using the light array 124 are not limiting and other arrangements of light projections 530 are contemplated. In further implementations, the light array 124 may include color projections and further arrangements using the color projections may be incorporated into these and other implementations.

Figure 6:
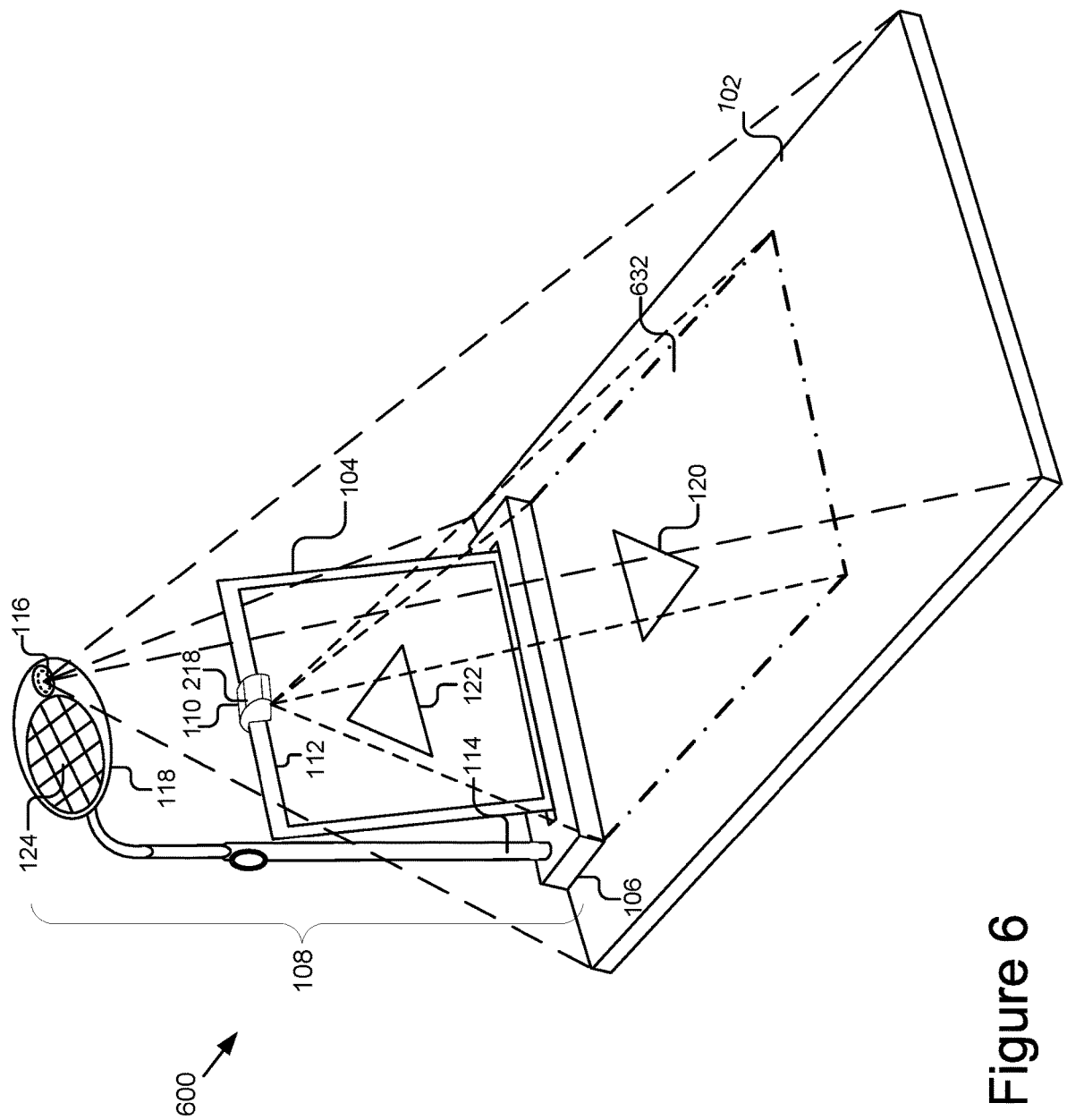
FIG. 6 illustrates another example configuration for a tangible object virtualization station including a separate display device capturing tangible objects.

FIG. 6 is a graphical representation 600 illustrating an example configuration including the tangible object virtualization station 108 and the display device 104. In the example, the station capture device 116 captures a field of view that includes the surface 102 and the video capture device 110 of the display device 104 captures a smaller field of view including an activity surface 632. In some implementations the smaller field of view including the activity surface 632 may be a portion of the surface 102, while in further implementations, the smaller field of view including the activity surface 632 may be separate from the surface 102 (e.g., a separate horizontal surface, a vertical surface, a surface behind the display device 104 and captured by a rear facing video capture device 110, etc.). By capturing two different fields of view simultaneously, the activity applications(s) 214 receives two different video streams encompassing different views allowing for additional information to be detected that a single video stream would not capture. In some implementations, by capturing both video streams, the detector 304 can focus on the smaller field of view of the activity surface 632 first and then perform secondary processing on the outer boundaries included in the video stream from the station capture device 116. For example, the detector 304 can process the video stream of the activity surface 632 at a higher framerate to capture interactions in more detail. In some implementations, the camera adapter 218 may be required to redirect the field of view of the video capture device 110 down towards the activity surface 632.

In some implementations, the video capture device 110 may direct a field of view using a front-facing camera that focuses on capturing a user rather than the surface 102. For example, a user may be interacting on the surface, such as creating a video of a do-it-yourself project, such as a cooking tutorial, make-up tutorial, painting tutorial, tutoring, etc. The station capturing device 116 captures the tangible object(s) 120 as they are manipulated on the surface, while simultaneously, the video capture device 110 captures the user as the user describes the process of manipulating the tangible object(s) 120. This example enables the user to easily capture two different fields of view simultaneously without positioning multiple cameras in different locations.

Figure 7:
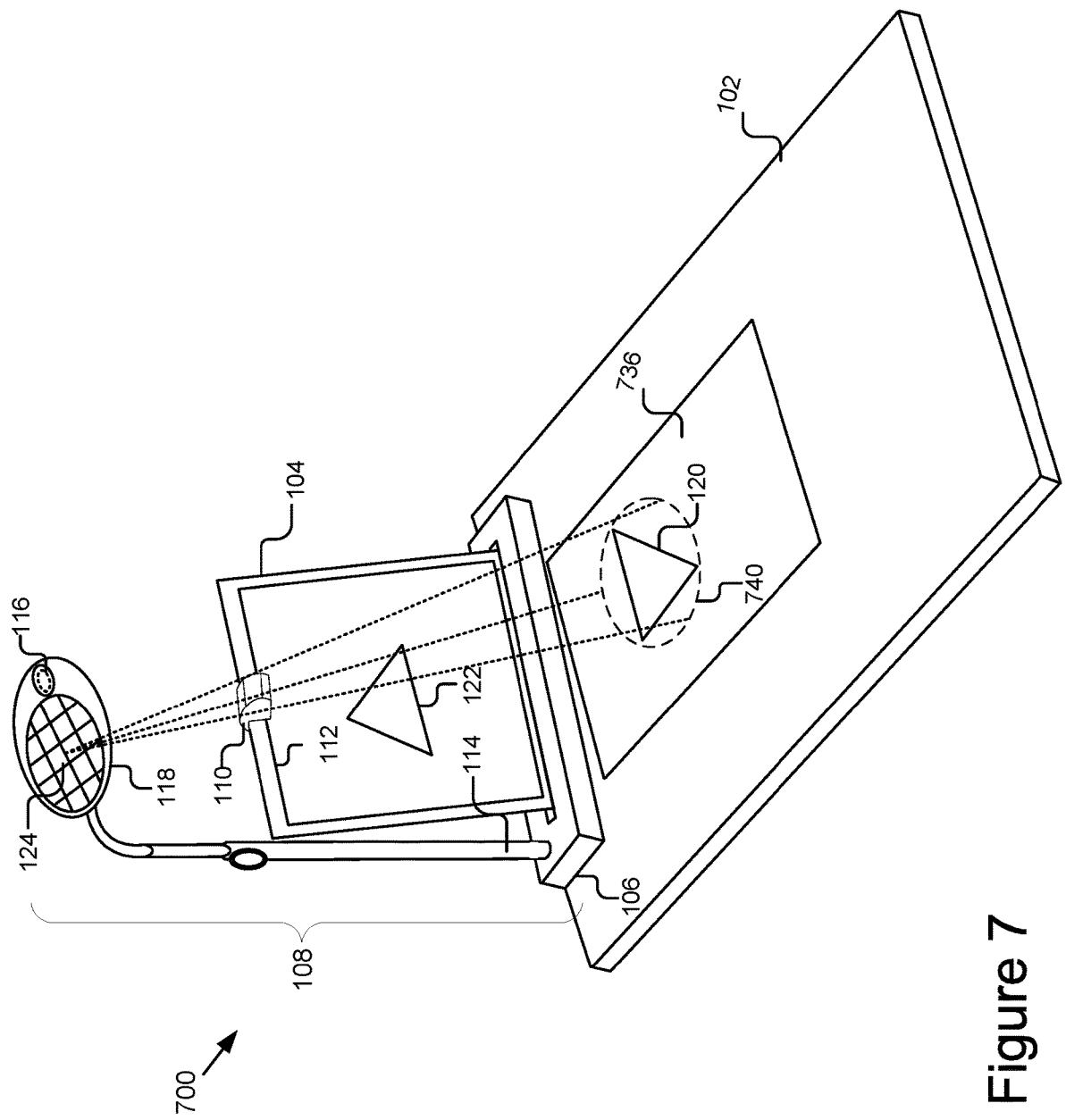
FIG. 7 illustrates another example configuration for a tangible object virtualization station.

FIG. 7 is a graphical representation 700 illustrating another example configuration for a tangible object virtualization station 108. In this example implementation, a tangible activity surface 736 is positioned on the surface 102. The tangible activity surface 736 may be a drawing surface such as an activity object, white board, sheet of paper, item to paint, cooking utensils, make-up products, crafting materials, books, homework, etc. or a preconfigured activity surface 736 that the detector 304 recognizes. In this example, the activity application(s) 214 causes the lighting array to project a light projection 740 onto the tangible activity surface 736. In some implementations, the tangible activity surface 736 may include magnetic coupling devices that allow the tangible activity surface 736 to couple to corresponding magnetic coupling devices included in the base 106.

In some implementations, the surface 102 may be preconfigured for certain activities. As depicted in FIG. 7, an example configuration may include a surface 102 that includes a physical activity surface 736 such as a whiteboard or drawing board. The physical activity surface 736 may be integrated with the base 106 or may be distinct from the base 106 but placeable adjacent to the base 106. The physical activity surface 736 can indicate to the user the boundaries of a primary focus area that is within the field of view of the station capture device 116.

In some implementations, the physical activity surface 736 may be a board, such as a chalkboard, whiteboard, cooking utensil, book, craft project (made of wood, paper, plastic, metal, etc.), or piece of paper that is separate from the surface 102. In further implementations, the physical activity surface 736 may have built in buttons or other tangible object(s) 120 that may be incorporated directly into the physical activity surface 736. In further implementations, the physical activity surface 736 may have portions that included markings or designations to separate them from the rest of the physical activity surface 736 indicating places where various interactions may occur (not shown), such as a QR code, visual characteristic recognizable by the detector 304 that is unique or distinct in appearance and can be matched to a database of applications or routines when detected by the detector 304.

In some implementations, the surface 102 may be a table with a large enough width of a play area for two or more users to sit side by side and still interact with the space on the table. For example, two users could sit side by side along a longer side of a rectangular table and the station capture device 116 may project using the light array 124 one or more indicators onto the table for the two users to interact with. By allowing the station capture device 116 to capture video stream of a significant portion of a large table a group of two or more users can all interact with tangible object(s) 120 and the station capture device 116 may capture the interactions of the group of users. These implementations could allow for a large group of users to interact with a single station capture device 116, allowing for group games, collaboration, multiple users to interact at the same time, etc. These actions are possible because, in these implementations, the station capture device 116 is capable of viewing more than just the area directly in front of and proximate to the display device 112.

Figure 8:
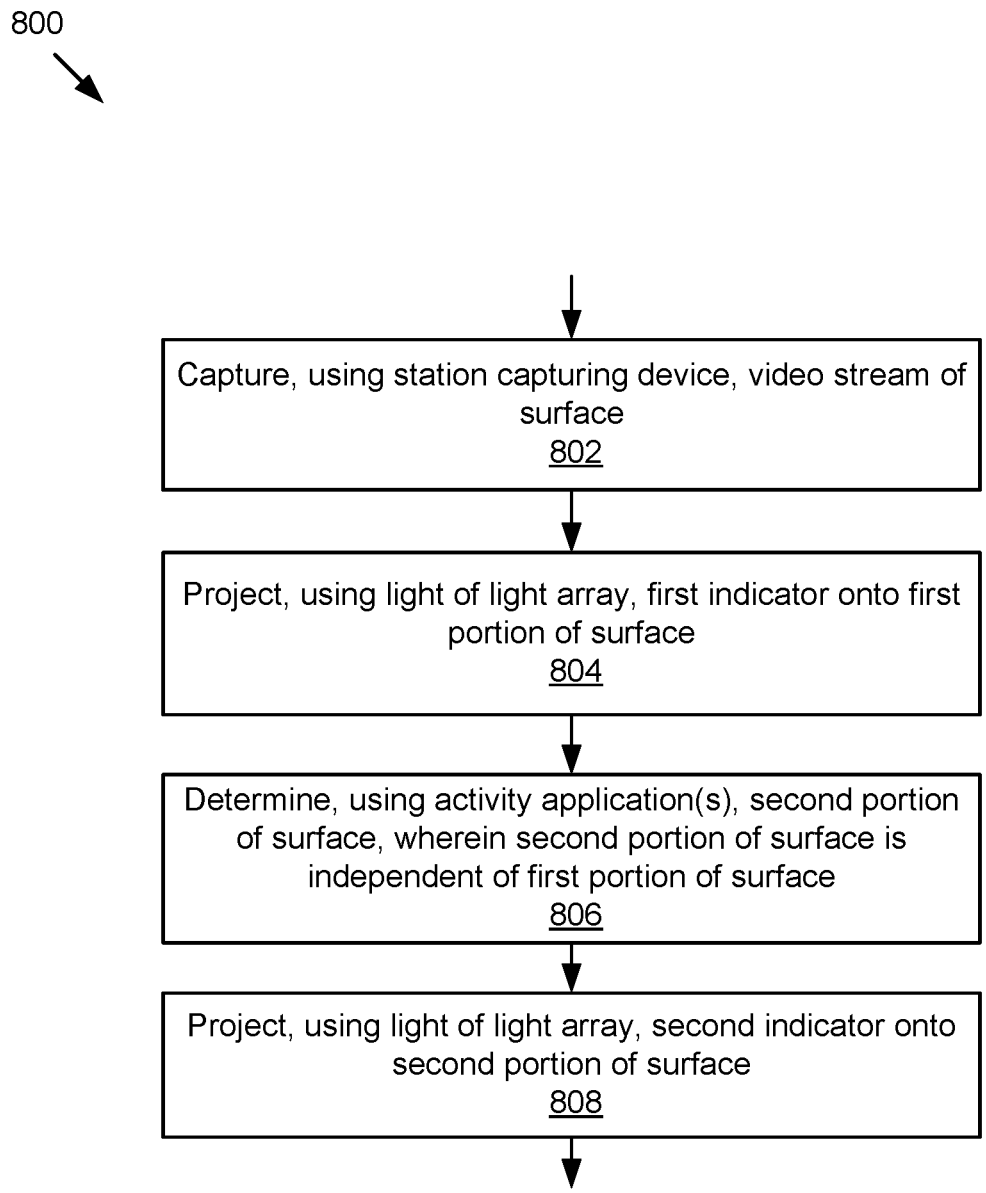
FIG. 8 is a flowchart of an example method for projecting indicators onto a physical activity surface using a tangible object virtualization station.

FIG. 8 is a flowchart of an example method 800 for projecting a first projection and a second projection onto the surface 102. At 802, the station capture device 116 captures a video stream of the surface 102. In some implementations, the video stream may include a portion of the surface 102, while in further implementations; the video stream includes the entire visible area of the surface 102.

At 804, the activity application(s) 214 causes one or more lights of the lighting array to project a first light projection forming a first light indicator onto a first portion of the surface 102. In some implementations, the activity application(s) 214 may determine that the first light projection should appear on the surface 102 based on a detection of a tangible object(s) 120 or a determination that an indicator should be presented to a user at the first portion of the surface 102.

At 806, the activity application(s) 214 determines that a second portion of the surface 102 should have an indicator presented on the second portion. In some implementations, the activity application(s) 214 may determine that the indicator should be presented based on the activity application(s) 214 determining that a tangible object(s) 120 is missing from a location. In further implementations, the activity application(s) 214 may determine that an instruction to a user should be presented in the form of the indicator.

At 808, the activity application(s) 214 may cause one or more lights of the lighting array to project a second light projection forming a second light indicator onto the second portion of the surface 102. In some implementations, the second portion of the surface 102 is disparate from the first portion of the surface 102.

Figure 9:
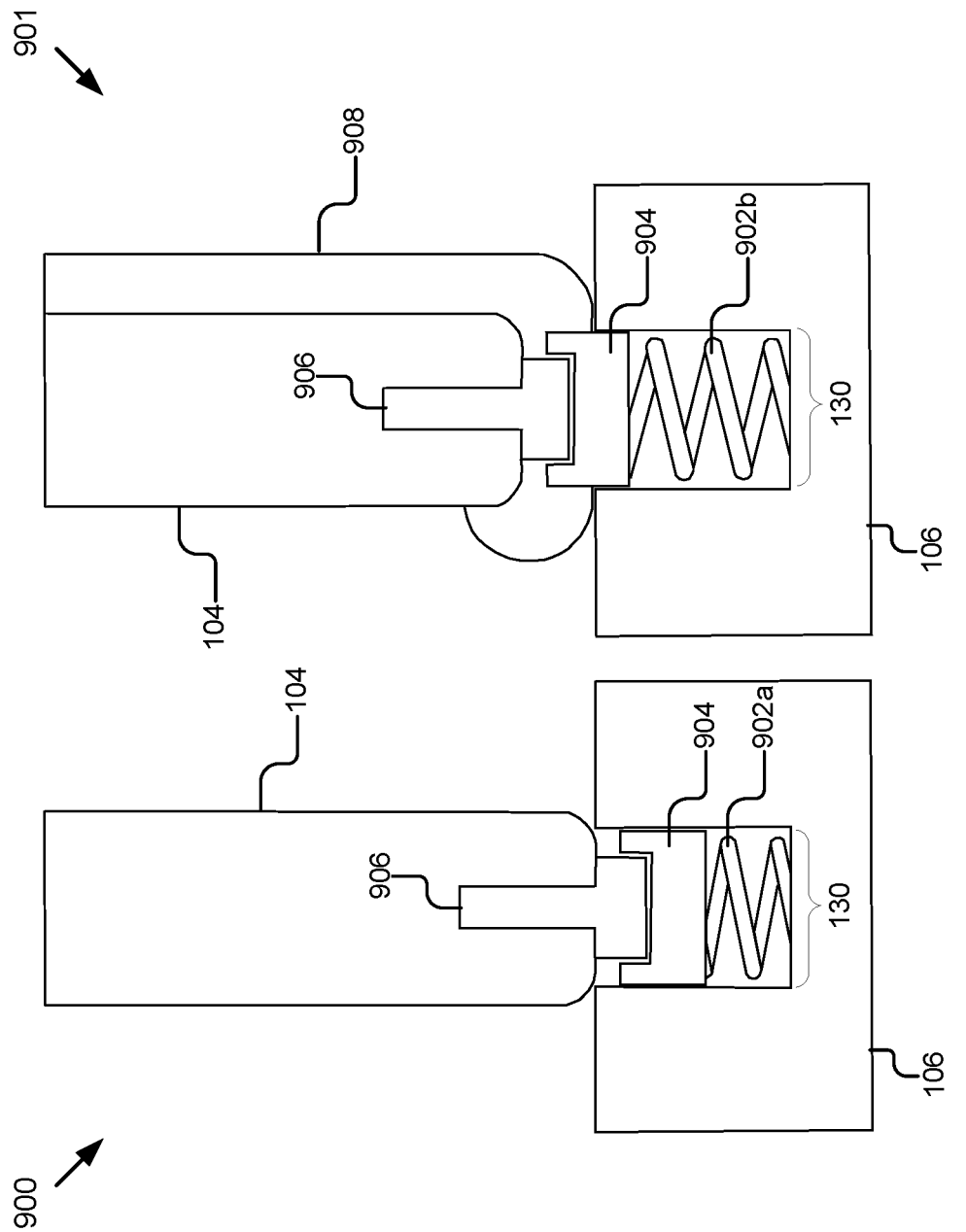
FIGS. 9A and 9B are example configurations of a slot and display device.

FIGS. 9A and 9B are example configurations, 900 and 901 respectively, of a slot 130 and display device 104 showing a cross sectional, side view. As shown in the example in FIG. 9A, the display device 104 may include a power port 906 which may be configured to couple to a power connector 904 and provide power to the display device 104 when the display device 104 is positioned within the slot 130. In some implementation, the power connector 904 may provide power to charge the display device 104 when the display device 104 is positioned within the slot 130. In some implementations, the power connector 904 may be a power cord connected to an outlet on the wall, or similar means of providing power, such as a battery, wireless charging, etc. The power connector 904 may be situated within the slot 130 and configured to couple to the power port 906 when the display device 104 is situated within the slot 130. In some implementations, as shown in FIGS. 9A and 9B, the power connector 904 and the power port 906 may connect to each other using magnetic coupling, which allows for easier connection of the display device 104 as an electrical lead or prong does not have to be precisely inserted into an outlet. The magnetic coupling further provides for easier alignment as the magnetic coupling between the two components will magnetically pull the display device 104 into a correct alignment within the slot 130. Furthermore, the magnetic coupling of the power connector 904 and the power port 906 may allow for easier positioning and removal of the display device 104 from the slot 130 since the display device 104 merely has to be lifted with enough force to break the magnetic coupling, rather than pulling an electrical lead out of an outlet. This is further beneficial in that if the display device 104 tips or falls, the magnetic coupling will separate, rather than breaking the connectors, which is especially beneficial when used with children.

In some implementations, the power port 906 may be a removable connector that is configured to connect within an existing connection of the display device 104. This allows the power port 906 to be easily connected to a variety of different display devices 104 without requiring the display devices to have an integrated power port that could couple to the power connector 904. In some implementations, the power connector 904 may be situated on a compressible component 902 (such as a spring or flexible membrane) that may be compressed when pressure or weight is placed on the power connector 904 in a direction that the compressible component 902 may be compressed. The compressible component 902 may allow display devices 104 of different configurations to be coupled to the power connector 904 and the power connector 904 can compress to a variety of different distances based on the configuration of the display device 104. Meaning that a display device 104 that has a heaver configuration, such as being installed inside a case 908 may compress the compressible component 902b as shown in FIG. 9B a greater distance, and compress the power connector 904 down into at least a portion of the slot 130, than the display device 104 that has a lighter configuration, such as not being in a case or being a lighter model or build of display device 104. The compressible component 902 allows a variety of configurations of display devices 104 to be used without requiring different power connectors 904 for each configuration. The compressible component 902 further provides that the power connector 904 may change positions, rather than the display device 104, providing for greater continuity between a variety of display device 104 configurations.

Figure 10:
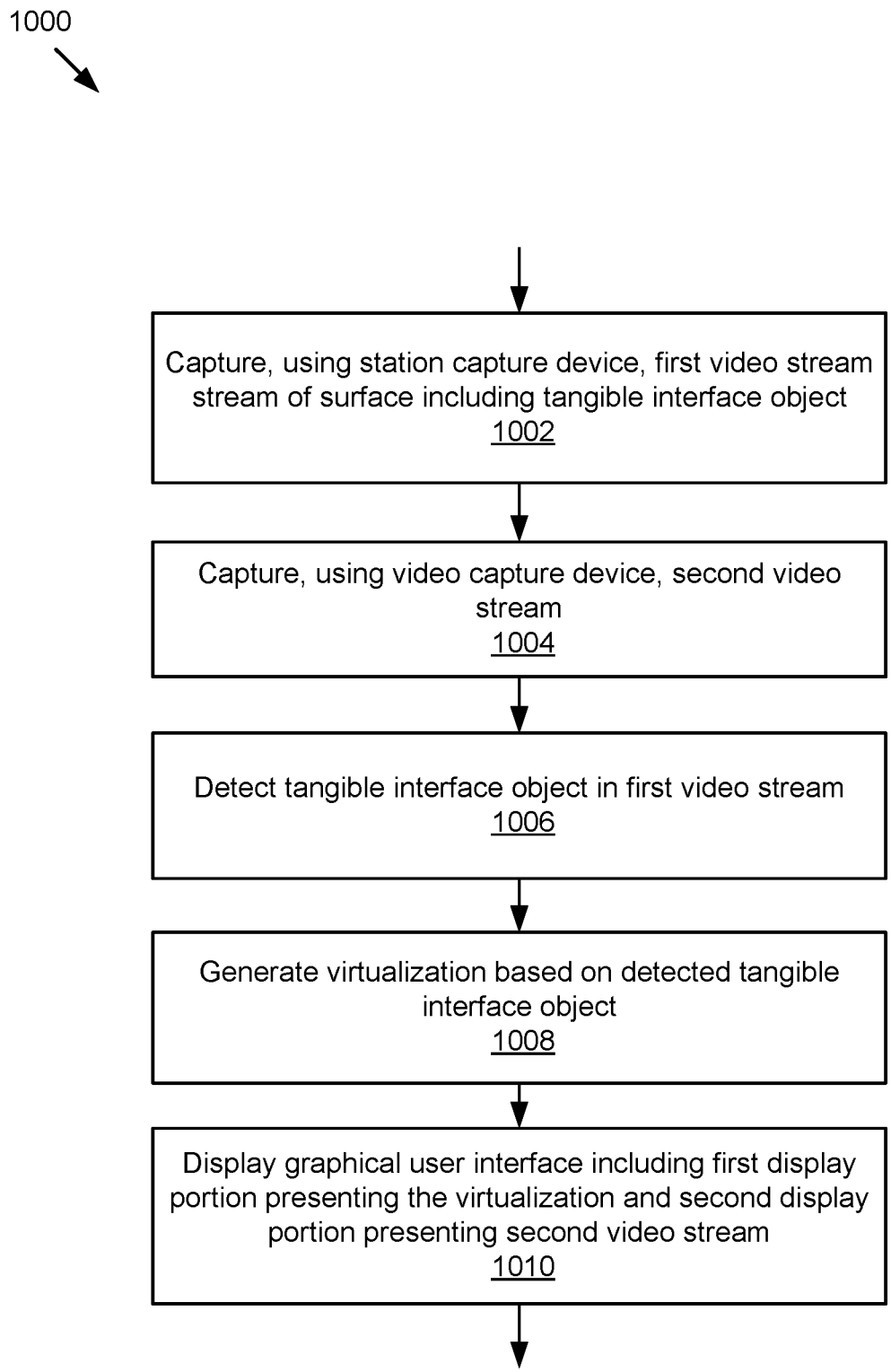
FIG. 10 is a flowchart of an example method for capturing video streams using the tangible object virtualization station.

FIG. 10 is a flowchart 1000 of an example method for capturing video streams using the tangible object virtualization station 108. At 1002, the station capture device 116 may be configured to capture a first video stream of a physical activity surface using a first camera of the station capture device 116. In some implementations, the first camera may be positioned above the physical activity surface 102 and the first video stream may depict an overhead view of the physical activity surface 102. In some implementations, the first video stream may further include a tangible interface object 120 as described elsewhere herein.

At 1004, a video capture device 110 may be used to capture a second video stream. In some implementations, the video capture device 110 may include a second camera coupled to the display device 104 positioned on the base 106 of the tangible virtualization station 108. In some implementations, the second video stream may include a user and the second camera may be a forward facing camera capturing a field of view in front of the display device when the display device is positioned substantially horizontal on the base 106. In further implementations, the second video stream may include the physical activity surface 102. In some implementations, the field of view of the second camera may be directed towards the physical activity surface, such as by redirecting the field of view using an adapter 218.

At 1006, a detector 304 may be used to detect the tangible interface object 120 included within the first video stream as described elsewhere herein. At 1008, the activity application(s) 214 may generate a virtualization 122 based on the detected tangible interface object 120 as described elsewhere herein. In some implementations, the virtualization 122 may be generated by extracting an image of the tangible interface object 120 from the first video stream and using image processing techniques to update the extracted image.

At 1010, a processor of the display device 104 may be used to display a graphical user interface on the display 112 of the display device 104. In some implementations, the graphical user interface may be divided into multiple display portions, such as a first display portion and a second display portion. The first display portion and the second display portion may be separate from each other, overlap, picture-in-picture, etc. In some implementations, the first display portion may present the virtualization 122 based on the detected tangible interface object 120. In further implementations, the first display portion may also include a virtual scene with routines, animations, and/or additional graphical elements to display. In some implementations, the second display portion may present a stream of the second video stream for display on the second display portion of the graphical user interface. In some implementations, the second video stream may be presented as it is captured by the second camera, while in further implementations, the second video stream may be compressed and displayed in the compressed format, such as to improve the display of the second video stream. It should be understood that either portion of the graphical user interface is capable of presenting a video stream, virtualization 122, or other element either individually or in parallel and is not limited by this example.

The tangible object virtualization station 108 augments the interactions of a user in various situations. For example, the tangible object virtualization station 108 can be used for instructions purposes both to track a user, or in content creation such as food processing, do-it-yourself videos, drawing, homework assistance, and interactive games, both virtually and tabletop games. In one use case, the tangible object virtualization station 108 may be used for motion capture movie creation by allowing a user to quickly set up a scene and using a gesture or action to trigger the activity application(s) 214 to capture a scene without having to push a button.

This technology yields numerous advantages including, but not limited to, providing a low-cost alternative for developing a nearly limitless range of applications that blend both physical and digital mediums by reusing existing hardware (e.g., camera) and leveraging novel lightweight detection and recognition algorithms, having low implementation costs, being compatible with existing display device hardware, operating in real-time to provide for a rich, real-time virtual experience, processing numerous (e.g., >15, >25, >35, etc.) tangible object(s) 120 simultaneously without overwhelming the display device, recognizing tangible object(s) 120 with substantially perfect recall and precision (e.g., 99% and 99.5%, respectively), being capable of adapting to lighting changes and wear and imperfections in tangible object(s) 120, providing a collaborative tangible experience between users in disparate locations, being intuitive to setup and use even for young users (e.g., 3+ years old), being natural and intuitive to use, and requiring few or no constraints on the types of tangible object(s) 120 that can be processed.

It should be understood that the above-described example activities are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of display device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic display device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A tangible object virtualization station, comprising:
   a base capable of stably resting on a surface, the base including a display interface situated within the base;
   a support including a first end connected to the base and extending upwardly from the base;
   a head component unit separate from the display interface and connected to a second end of the support, the head component unit including a camera situated to capture a substantially downward view of an area of the surface, the area of the surface being proximate to the base and within a field of view of the camera; and
   the display interface configured to hold a display device in an upright position and connect the display device to the camera.

2. The tangible object virtualization station of claim 1, wherein the display interface is situated within the display device, the display device being separable from the base.

3. The tangible object virtualization station of claim 2, wherein the camera is a first camera and wherein the display device includes the display interface and the display interface further includes a second camera configured to capture a view separate from the first camera.

4. The tangible object virtualization station of claim 3, wherein the display interface may be divided into a first display section and a second display section, the first display section presenting at least a portion of the view of the first camera and the second display section presenting at least a portion of the view of the second camera.

5. The tangible object virtualization station of claim 4, wherein the first display section and the second display section are displayed concurrently on the display interface.

6. The tangible object virtualization station of claim 1, wherein the head component unit is detachably connectable to the base.

7. The tangible object virtualization station of claim 1, wherein the head component unit includes a lighting array.

8. The tangible object virtualization station of claim 7, wherein the lighting array is configured to highlight the field of view of the camera to indicate the area of the surface within the field of view of the camera.

9. The tangible object virtualization station of claim 7, wherein the lighting array further comprises:
   a first light configured to direct light downward to a first portion of the surface; and
   a second light configured to direct light downward to a second portion of the surface.

10. The tangible object virtualization station of claim 9, wherein the first portion of the surface includes a tangible object and the first light is directed downward onto the tangible object.

11. The tangible object virtualization station of claim 1, further comprising:
    a first calibration sensor incorporated into the base, the first calibration sensor being detectable by a calibrator;
    a second calibration sensor incorporated into the head component unit, the second calibration sensor being detectable by the calibrator; and
    the calibrator coupled to the tangible object virtualization station configured to calibrate information captured by the camera based on the first calibration sensor and the second calibration sensor.

12. The tangible object virtualization station of claim 1, wherein the display interface is included within the base and wherein the base is further configured to receive an edge of the display device within a slot of the display interface and retain the display device.

13. The tangible object virtualization station of claim 12, wherein the base further comprises:
    a power connector situated within the slot, the power connector being configured to couple to the display device to provide power to the display device when the display device is positioned within the slot of the base.

14. The tangible object virtualization station of claim 13, wherein the base further comprises:
    a compressible component located beneath the power connector, the compressible component configured to be compressed when the display device is positioned within the slot of the base, the compressible component being configured to compress when the display device is positioned within the slot of the base.

15. The tangible object virtualization station of claim 14, wherein the compressible component is configured to compress to different distances based on a configuration of the display device.

16. The tangible object virtualization station of claim 1, further comprising:
  a projector configured to project a point of light onto the surface.

17. The tangible object virtualization station of claim 16, wherein the projector is a laser projector.

* * * * *